United States Patent
Lo et al.

(10) Patent No.: US 8,701,066 B1
(45) Date of Patent: Apr. 15, 2014

(54) EXTRACTING CAPACITANCE AND RESISTANCE FROM FINFET DEVICES

(71) Applicant: Cadence Design Systems, Inc., San Jose, CA (US)

(72) Inventors: Chi-Yuan Lo, Basking Ridge, NJ (US); Mikhail Khapaev, Moscow (RU)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/655,413

(22) Filed: Oct. 18, 2012

Related U.S. Application Data

(60) Provisional application No. 61/665,863, filed on Jun. 28, 2012.

(51) Int. Cl.
*G06F 17/50* (2006.01)
*G06F 17/11* (2006.01)

(52) U.S. Cl.
CPC ........ *G06F 17/5081* (2013.01); *G06F 17/5018* (2013.01); *G06F 17/11* (2013.01); *G06F 2217/16* (2013.01)
USPC ................. 716/111; 716/136; 716/55; 703/2; 703/14

(58) Field of Classification Search
CPC . G06F 17/5081; G06F 17/5018; G06F 17/11; G06F 2217/16
USPC ............................ 716/111, 136, 55; 703/2, 14
See application file for complete search history.

(56) References Cited

U.S. PATENT DOCUMENTS

| | | | | |
|---|---|---|---|---|
| 5,388,055 | A * | 2/1995 | Tanizawa et al. | 716/123 |
| 6,438,729 | B1 | 8/2002 | Ho | |
| 7,124,378 | B2 * | 10/2006 | Matsuzawa | 716/111 |
| 7,367,000 | B2 * | 4/2008 | Kurihara et al. | 716/115 |
| 7,617,467 | B2 * | 11/2009 | Bell et al. | 716/106 |
| 7,962,866 | B2 | 6/2011 | White et al. | |
| 8,171,446 | B2 * | 5/2012 | Inoue | 716/127 |
| 8,249,849 | B2 * | 8/2012 | Amano | 703/14 |
| 8,274,097 | B2 | 9/2012 | Cheng | |
| 8,307,318 | B2 * | 11/2012 | Kim et al. | 716/119 |
| 8,566,762 | B2 * | 10/2013 | Morimoto et al. | 716/102 |
| 2003/0163793 | A1 * | 8/2003 | Matsuzawa | 716/4 |
| 2007/0044046 | A1 * | 2/2007 | Faour et al. | 716/2 |
| 2007/0044047 | A1 * | 2/2007 | Kurihara et al. | 716/2 |
| 2007/0044063 | A1 * | 2/2007 | Faour | 716/16 |
| 2008/0148199 | A1 * | 6/2008 | Bell et al. | 716/5 |

(Continued)

OTHER PUBLICATIONS

U.S. Appl. No. 13/655,420, filed Oct. 18, 2012, Cadence Design Systems, Inc.

(Continued)

*Primary Examiner* — Phallaka Kik
(74) *Attorney, Agent, or Firm* — Adeli LLP

(57) ABSTRACT

Some embodiments of the invention provide a method for verifying an integrated circuit (IC) design. The method receives a process description file that specifies a process technology for building the IC. The process description file describes a particular device type in which a first conductor overlaps a second conductor by recessing from the second conductor in one or more cut-outs. Based on the process description file, the method finds a section of the IC design that matches the particular device type and uses the description of the particular device type to compute a capacitance value and a resistance value for the section of the IC design.

26 Claims, 27 Drawing Sheets

(56) References Cited

U.S. PATENT DOCUMENTS

| | | |
|---|---|---|
| 2009/0007035 A1 | 1/2009 | Su et al. |
| 2009/0031261 A1 | 1/2009 | Smith et al. |
| 2010/0025859 A1* | 2/2010 | Inoue .......................... 257/774 |
| 2010/0117162 A1* | 5/2010 | Rohrer et al. ................. 257/401 |
| 2010/0180241 A1 | 7/2010 | Asai |
| 2010/0190277 A1* | 7/2010 | Lin et al. ....................... 438/17 |
| 2011/0049629 A1 | 3/2011 | Ishikawa et al. |
| 2013/0019214 A1* | 1/2013 | Morimoto et al. ............ 716/101 |
| 2013/0020707 A1 | 1/2013 | Or-Bach et al. |

OTHER PUBLICATIONS

Portions of prosecution history of U.S. Appl. No. 13/655,420, Aug. 26, 2013, Cadence Design Systems, Inc.

Updated portions of prosecution history of U.S. Appl. No. 13/655,420, Nov. 4, 2013, Cadence Design Systems, Inc.

* cited by examiner

```
Conductor "OD_fin" {
        sub_conductor "device_OD_fin" {}
}
```

```
Conductor "poly" {
        sub_conductor "fpoly" {}
        sub_conductor "device1" {
                recessed_from_sub_conductor "device_OD_fin"
                top_separation 0.002
                side_separation 0.002
        }
}
```

```
Dielectric "gox" {
        expanded_from_sub_conductor "device1" {
                dielectric_constant 7.3
                bottom_expand 0.002
                inner_expand 0.002
                inner_side_expand 0.002
        }
}
```

EXTRACTING CAPACITANCE AND RESISTANCE FROM FINFET DEVICES

CLAIM OF BENEFIT TO PRIOR APPLICATIONS

This present Application claims the benefit of U.S. Provisional Patent Application 61/665,863 filed Jun. 28, 2012. U.S. Provisional Patent Applications 61/665,863 is incorporated herein by reference.

BACKGROUND

Planar transistors have been the core of integrated circuits for several decades, during which the size of the individual transistors has steadily decreased. As the size decreases, planar transistors increasingly suffer from the undesirable short-channel effect, especially "off-state" leakage current, which increases the idle power required by the device. In order to extend Moore's Law by continuing to create integrated circuit (IC) devices with ever smaller transistors and memory cells, semiconductor manufacturers have been developing several strategies.

Some of these strategies focus on non-planar devices. Some non-planar devices are referred to as FinFET devices, since the conducting channel in a FinFET transistor is wrapped by a thin silicon "fin". The thickness of the fin (measured in the direction from source to drain) determines the effective channel length of the device. Some non-planar devices are also referred to as multigate devices, since the channel is surrounded by several gates on multiple surfaces, allowing more effective suppression of "off-state" leakage current. Multiple gates allow enhanced current in the "on" state, also known as drive current. These advantages translate to lower power consumption and enhanced device performance. Non-planar devices are more compact than devices with conventional planar transistors. This enables higher transistor density, which translates to smaller overall microelectronics.

One reason why non-planar devices are able to achieve higher transistor density and faster performance is that non-planar devices use all three dimensions to create transistors. Unlike traditional planar devices which use only surface areas along the top of the IC to form transistor gate channels, non-planar devices use surface areas along the thickness of the conductors in addition to surface areas along the top. This is why transistors in non-planar devices are able to switch faster, and why non-planar devices are able to pack in many more transistors per unit area.

Using all three dimensions to create transistors means that a non-planar IC design cannot be adequately represented by a collection of two dimensional polygons of uniform thickness. Using all three dimensions also means that a non-planar IC design cannot be properly verified unless verification tools extract parasitic capacitors and resistors along all three dimensions. This fact makes non-planar devices not only more difficult to manufacturer, but also more difficult to design and verify.

One possible solution is to represent each non-planar IC design as a collection of three dimensional objects. Such a representation is capable of yielding accurate models of transistors as well as parasitic elements. However, to three-dimensionally represent all physical elements in an IC requires far too much computing resources as well as engineering time. Another possible solution is to represent non-planar IC designs two dimensionally while approximating or extrapolating parasitic elements from the two dimensional polygons. This approach, though feasible in terms of cost and time, is not likely to yield sufficiently accurate verification models for non-planar devices that are densely filled with smaller and faster switching transistors.

There is therefore a need for an IC verification tool that accurately extracts parasitic elements from non-planar devices. Such an IC verification tool should be capable of associating three-dimensional properties of non-planar devices with two-dimensional representations of physical elements in the IC.

SUMMARY

In order to verify an integrated circuit (IC) design under a non-planar device process technology, some embodiments provide a verification tool that extracts parasitic capacitance and resistance values based on the three dimensional (3D) geometries of the conductors and dielectrics in the IC design. The tool receives a process description file that specifies a process technology for building the IC. The process description file describes a particular device type in which a first conductor overlaps a second conductor by recessing from the second conductor in one or more cut-outs. Based on the process description file, the tool finds a section of the IC design that matches the particular device type and uses the description of the particular device type to compute a capacitance value and a resistance value for the section of the IC design. The capacitance value and the resistance value are computed by examining the three-dimensional (3D) geometry of the cut-outs in the first conductor.

In some of these embodiments, a numerical solver is used to compute the gate resistance of non-planar devices such as FinFETs based on the cut-out in the polysilicon. In some embodiments, the numerical solver performs calculation by dividing FinFET cut-out surface area into smaller units. The calculation is based on the spatial coordinate of each of these smaller units of cut-out surface areas. In some embodiments, the numerical solver is given the following parameters to account for the geometry of the cut-out: (i) number of fins; (ii) the location of the first fin; (iii) the width of each fin; and (iv) the spacing between two neighboring fins.

Some embodiments of the solver compute the gate resistance by setting uniform current to each of the unit surface areas. The numerical solver sets the voltage at a gate contact to zero and the current entering the gate contact to 1. The numerical solver also sets the total current exiting the cut-out (i.e., gate) to 1, and the current vector perpendicular to the unit surface areas to be uniform. To determine the gate resistance, the solver in some embodiments determines voltage $V_i$ at each of the unit surface areas by solving a Laplace boundary value problem. The gate resistance is then computed by dividing the average of the voltages at the different unit surface areas by the total current.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

FIG. 16 illustrates a portion of an example process description file that can be used by a RC extraction tool to determine the 3D geometries of the FinFET.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for verifying an integrated circuit (IC) design. The method receives a process description file that specifies a process technology for building the IC. The process description file describes a particular device type in which a first conductor overlaps a second conductor by recessing from the second conductor in one or more cut-outs. Based on the process description file, the method finds a section of the IC design that matches the particular device type and uses the description of the particular device type to compute a capacitance value and a resistance value for the section of the IC design. The capacitance value and the resistance value are computed by examining the three-dimensional (3D) geometry of the cut-outs in the first conductor.

A FinFET transistor is a device in which a first conductor overlaps a second conductor by recessing from the second conductor in one or more cut-outs. Such a device cannot be manufactured by a standard 2D device process technology in which only lengths and widths of conductors are considered. A FinFET transistor can only be manufactured by a 3D device process technology in which the thickness of individual device-forming conductors are considered. In order to verify an IC design under a 3D device process technology, some embodiments provide a verification tool that extracts parasitic capacitance and resistance values based on the 3D geometries of the conductors and dielectrics in the IC design. Section I below describes the use of process description for 3D device process technology for extracting capacitance and resistance from an IC design. Section II describes several techniques of determining resistance in 3D device process technology.

I. Process Description for 3D Device Process Technology

Figure 1:
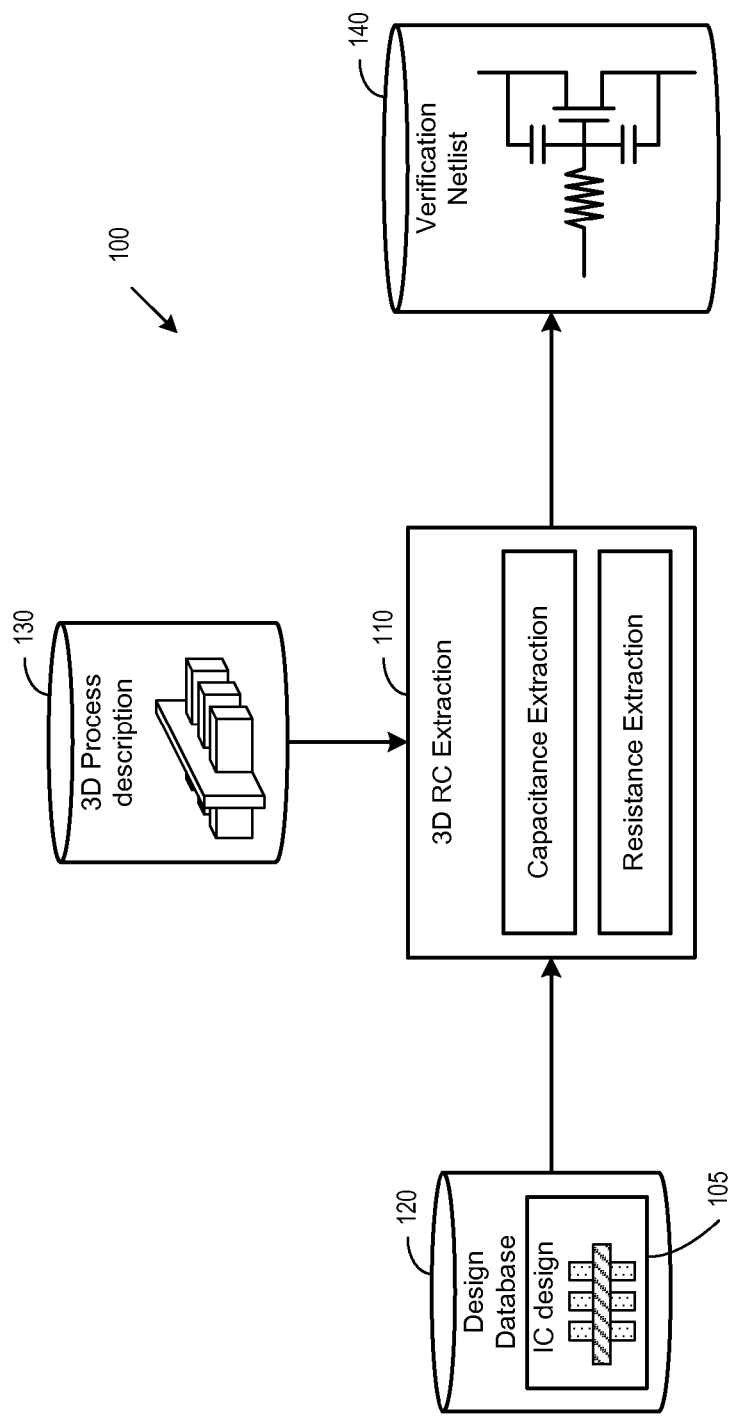
FIG. 1 illustrates an IC design flow for verifying an IC design under a 3D device process technology.

For some embodiments, FIG. 1 illustrates an IC design flow 100 for verifying an IC design 105 under a 3D device process technology. Such a process technology allows the IC design 105 to have devices in which a first conductor overlaps a second conductor by recessing from the second conductor in one or more cut-outs. The IC design flow 100 analyzes the 3D geometries of various conductors and dielectrics in the IC design 105 and computes the capacitance and resistance values based on those geometries. The computation (or the extraction) of the capacitance and resistance is also based on parameters specific to the process technology, which are provided by a 3D process description file 130. A 3D RC (resistance/capacitance) extraction tool 110 performs RC extraction based on the process description file 130 and the design database 120. The extracted resistances and capacitances are incorporated into a verification netlist 140, which enumerates the connections and the components/devices in the IC design. The verification netlist 140 is then used by IC design verification tools to determine whether the IC design 105 would function as intended.

The design database 120 stores the information that specifies the IC design 105. In some embodiments, the design database 120 is created by a sequence of IC design tools (e.g., synthesis, place/route, floor planning, and layout editing) that turns high level functional descriptions of the IC design 105 into lower level circuit representations. In some embodiments, these lower level representations of the IC design 105 includes a set of symbolic representations that specifies various physical elements in a physical IC such as metal wires, polysilicon strips, oxides, diffusion regions, and vias. These physical elements in turn form the transistors, logic gates, and storage elements in the physical IC. In some embodiments, the set of symbolic representations in the design database are in a two-dimensional graphical layout, wherein each symbolic representation is a 2D graphical element (e.g., a polygon) that represents a physical element in the physical IC.

In some embodiments, the graphical elements of the design database 120 are stored in several layers, each layer corresponding to a particular type of physical elements in the design. For example, there is a layer for polysilicon, a layer for diffusion, a layer for metal layer M1, a layer for metal M2, a layer for vias, etc. In some embodiments, the design database also includes a marker layer, which marks the positions of cut-outs in conductors.

The process description 130 includes parameters that are specific to the process technology used for manufacturing the IC. In some embodiments, the process description 130 is provided by the vendor who provides the process technology. Unlike the design database 120 which is specific to a particular IC design (e.g., IC design 105), the parameters in the process description 130 are general to all IC designs that use the process technology provided by the technology vendor.

Included in the process description 130 are technology-specific parameters associated with different types of physical elements in an IC. In some embodiments, these technology-specific parameters are also specific to a given temperature condition or process variation assumption. Each type of physical element has its own set of descriptions that includes its associated technology specific parameters. In some embodiments, the different types of physical elements are categorized as conductors, dielectrics, and vias.

A description for a physical element type in some embodiments specifies which category of physical elements it belongs to and provides parameters specific to its category. For example, a description for a conductor type would include parameters such as resistivity, thickness, required spacing, and minimum width for that type of conductor, while a description for a dielectric type would include parameters such as the dielectric constant and thickness for that type of dielectric. The descriptions for some types of physical elements also include parameters that define relationships with other types of physical elements. For example, a description for a type of dielectric would specify the relationships between a dielectric of this dielectric type with a conductor of a particular conductor type, while a description for a via type would specify two conductor types that respectively connect the top and bottom of a via in this via type.

Conductor types that are available in some embodiments include polysilicon, diffusion, metal M1, metal M2, etc. Some embodiments further include sub-types for each conductor type. For example, the conductor type polysilicon can include sub-conductor types such as "n-poly", "g-poly", "p-poly", while the conductor type "diffusion" can include sub-conductor types such as "n-od" and "p-od". The sub-conductor types inherit the parameters of their parent conductor types while additionally specifying their own parameters. For example, in some embodiments, sub-conductor "p-poly" inherits the minimum width and spacing requirement from its parent conductor type "polysilicon" while specifying its own resistivity and thickness.

The RC extraction tool 110 extracts capacitors and resistors from the IC design 105 by referencing the process description 130. Any conductor with any resistivity is also a resistor. Any two conductors sufficiently close to each other forms a capacitor. Any IC is filled with conductors and therefore necessarily populated with capacitors and resistors. However, many of these resistors and capacitors are not intended by the designer nor specified in the IC design 105. In order to properly verify the IC design 105, simulations of the IC that include the effects of these capacitors and resistors needs to be performed. The RC extraction tool 110 is a tool that extracts these capacitors and resistors from the design database 120 and produces a verification netlist that includes the extracted capacitors and resistors.

In some embodiments, the RC extraction tool 120 searches the design database 120 for patterns of polygons that match a set of criteria for resistance or capacitance extraction. For example, a capacitance will be extracted whenever two polygons representing two conductors overlap each other. Whenever such a pattern of polygons is found, the RC extraction tool computes capacitance and/or resistance by applying the process parameters from the process description 130 to the pattern of polygons. Specifically, parameters associated with the types of physical elements that are in the pattern of polygons will be used to compute resistance and/or capacitance for the pattern of polygons. For example, to extract a resistor from a stretch of polysilicon conductor, the RC extraction tool applies the resistivity parameter of polysilicon conductor type from the process description file 130 to the stretch of polysilicon conductor and computes the resistance. A process for extracting resistance and capacitance will be described below by reference to FIG. 5.

The verification netlist 140 is a file that details all components and all connections in the IC design 105. In addition to components such as transistors and/or logic gates, the verification netlist 140 also lists the resistors and capacitors extracted by the RC extraction tool 110. The verification netlist also details the interconnections between these various components. In some embodiments, the resistance and capacitance values of the extracted components are annotated within the verification netlist. In some embodiments, the resistance and capacitance values are stored in a separate file that can be read in conjunction with the verification netlist 140.

The verification netlist 140 can serve as input to various IC design verification tools for determining whether the IC design 105 in the design database 120 will function as intended. For example, some embodiments perform functional simulation of the IC design by having the verification netlist as the device under test (DUT) in a verification test bench. Some embodiments performs timing analysis on the verification netlist to make certain all data path will meet timing requirements (setup time, hold time, etc.).

As illustrated in FIG. 1, the process description 130 is a "3D" process description, and the RC extraction tool 110 is a "3D" RC extraction tool. This is because the IC design flow 100 is a design flow for an IC to be manufactured in a 3D device process technology. The process description file 130 includes physical element types that are defined three dimensionally, and the RC extraction tool 110 extracts capacitance and resistance by referencing parameters in the 3D process description 130 that are defined three dimensionally.

In traditional 2D process technologies, the thickness of conductors and dielectrics can be treated as constant. Variations in thickness will not meaningfully define the functionality and performance of the IC. In contrast, the thickness of conductor and dielectrics in a 3D device process technology can vary significantly. Such variation will meaningfully determine the functionality and performance of the IC manufactured under the 3D device process technology. In addition, functional components (e.g., transistors) as well as parasitic components (e.g., capacitors and resistors) in 3D process technologies are defined by the three-dimensional geometric relationships between the physical elements in the IC.

Figure 2:
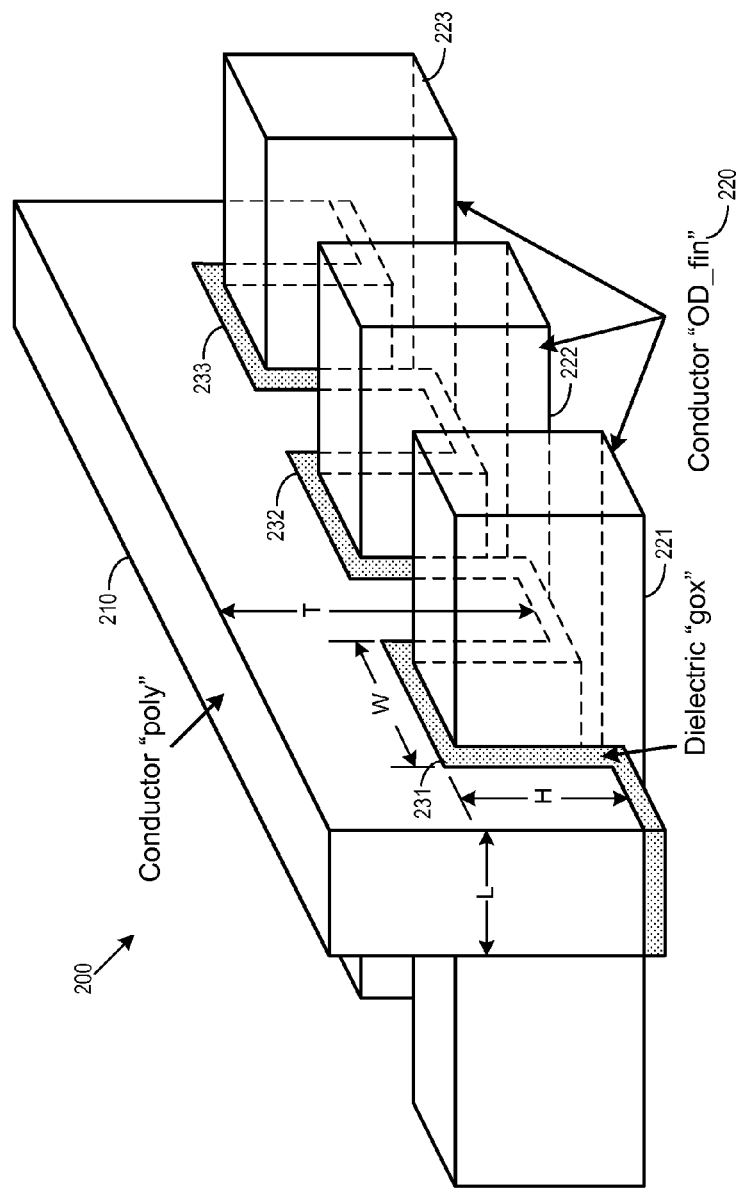
FIG. 2 illustrates a portion of the example FinFET transistor.
Figure 3:
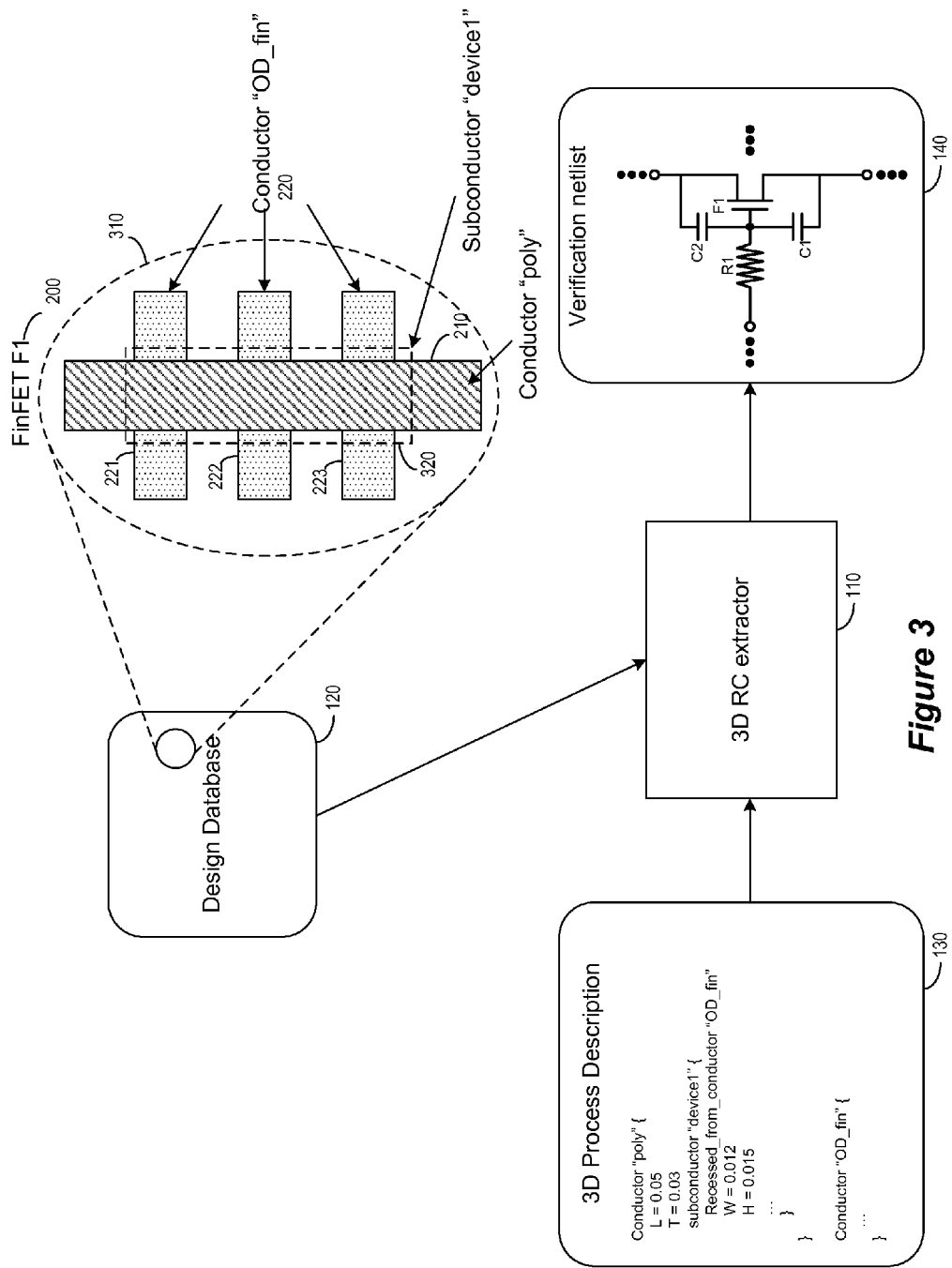
FIG. 3 illustrates the extraction of the capacitance and the resistance by a 3D RC extractor from a pattern of polygons that represents a FinFET.

FIGS. 2-3 illustrates the extraction of capacitance and resistance from an example FinFET transistor 200 by using a 3D process description. FIG. 2 illustrates a portion of the example FinFET transistor 200. As illustrated, the FinFET transistor 200 includes a first conductor 210 and a second conductor 220. The first conductor is of conductor type poly-silicon (labeled "poly") and the second conductor is of the conductor type diffusion (labeled "od_fin"). The first conductor 210 is recessed from the second conductor 220, forming several cut-out tunnels 231-232. The conductor "OD_fin" 220 includes several "fins" 221-223. Each "fin" of the conductor 220 fits into each of the cut-out tunnels of the conductor 210. The width of each cut out tunnel is W. The height of each of each cut out tunnel is H. The length of each cut out tunnel is L. The thickness of the conductor "poly" 210 is T at places without cut-outs. The first conductor 210 (conductor "poly") and the second conductor 220 (conductor "OD_fin") therefore forms a capacitor C1, whose capacitance is determined by dimensions W, L, and H. The first conductor 210 also forms a resistor R1, whose resistance is determined by L, W, H, and T.

FIG. 3 illustrates the extraction of the capacitors C1 and C2 and the resistor R1 by the 3D RC extractor 110 from a pattern of polygons that represents the FinFET 200. As illustrated, the RC extractor receives the design database 120 and the 3D process description 130. The design database 120 includes a pattern of polygons 310 that correspond to the FinFET 200. By referencing the 3D process description 130, the 3D RC extractor 110 extracts the capacitors C1 and C2 and the resistor R1 from the pattern of polygons 310. The 3D RC extractor 110 then produces a verification netlist 140, which includes R1, C1, and C2. R1 is the resistance from a contact terminal of the FinFET 200 to the actual gate of the FinFET. C1 is the capacitance between the source of the FinFET 200 and the gate of the FinFET 200, while C2 is the capacitance between the drain of the FinFET 200 and the gate of the FinFET 200.

The pattern of polygons 310 is part of a 2D design layout in the design database 120 that represents the IC design 105. In some embodiments, the pattern of polygons include only 2D information such as the width W and the length L, but no information in the third dimension such as $H_1$ and $H_2$. Without H and T, the values of R1, C1, and C2 cannot be calculated with sufficient accuracy. However, in some embodiments, the design database 120 includes a designation that marks the portion of the conductor 210 having cut-outs as belonging to a sub-conductor type "device1" (the dashed box 320). The sub-conductor type "device1" can be regarded as a device type, since it describes the relationships between two different conductor types (i.e., conductor type "poly" and conductor type "OD_fin") that form a transistor device.

The process description 130 on the other hand, supplies the missing information in the third dimension as parameters associated with different types of physical elements. Specifically, the process description 130 includes descriptions for the conductor type "poly" and the conductor type "OD_fin". The description of the conductor type "poly" specifies the thickness parameter T. The description for conductor type "poly" also specifies that the sub-conductor type "device1" includes the dimensions of the cut-out tunnels (i.e., W and H).

Since each polygon in FinFET 200 belongs to a conductor type that is described in the 3D process description 130 (the conductor 210 is of the conductor type "poly" and the conductor 220 is of the conductor type "OD_fin"), the 3D RC extractor can reference the 3D process description 130 and obtain the parameters for each of the polygons/conductors in the FinFET 200. Specifically, the RC extractor can reference the description for the conductor type "poly" and the sub-conductor type "device1" to obtain the dimensions of the cut-out tunnels. Once the RC extractor 110 has the geometry of the cut-out tunnels in all three dimensions, it can accurately calculate and include in the simulation netlist 140 the resistance for R1 and the capacitance for C1 and C2.

Figure 4:
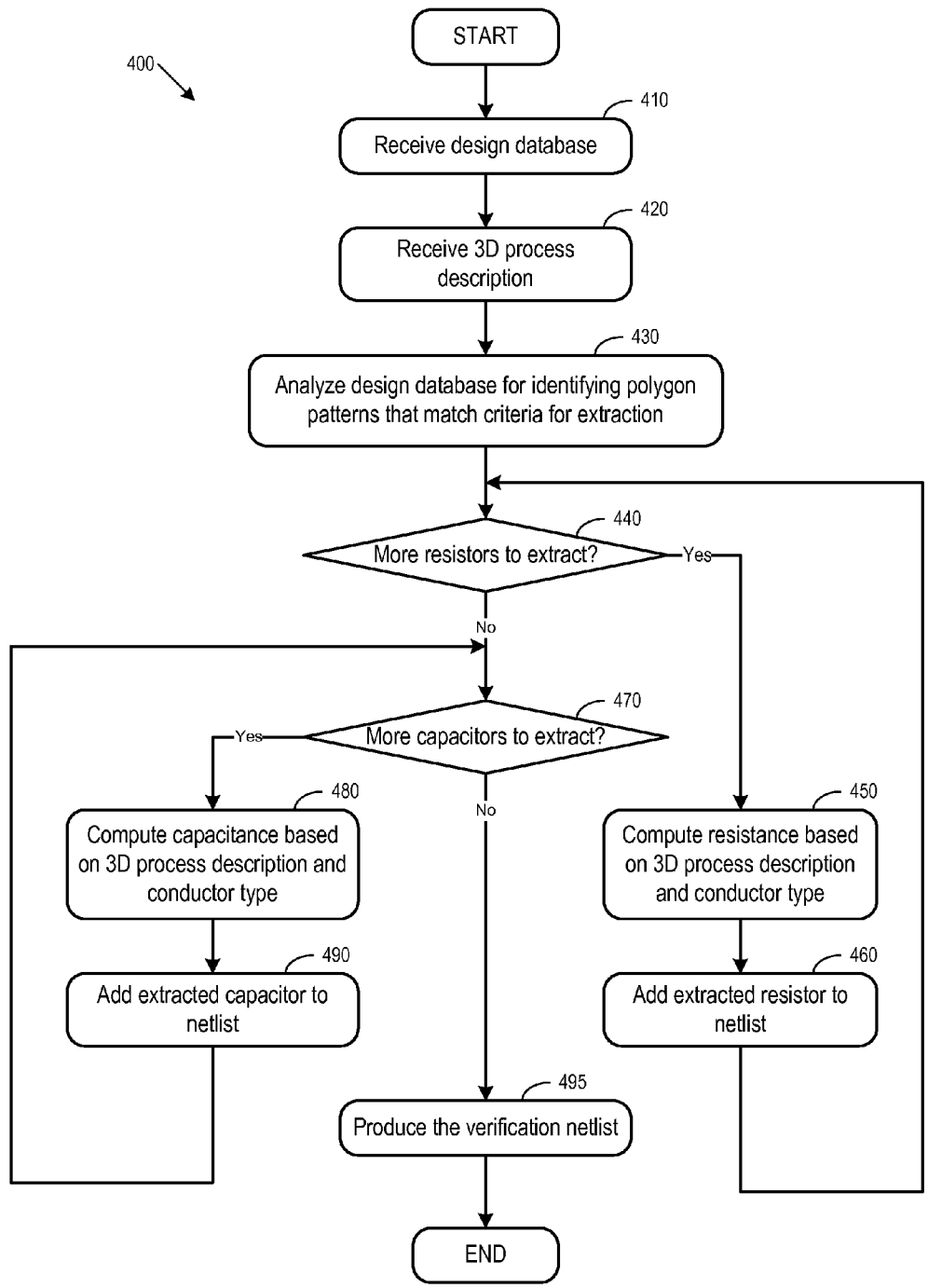
FIG. 4 conceptually illustrates a process for extracting capacitance and/or resistance from an IC design based on a 3D process description.

FIG. 4 conceptually illustrates a process 400 for extracting capacitance and/or resistance from an IC design based on a 3D process description. In some embodiments, the process 400 is performed by a 3D RC extraction tool such as the RC extraction tool 110. The process 400 starts when the 3D RC extraction tool is launched. The process receives (at 410) a design database for an IC design and receives (at 420) a 3D process description for the process technology that is to be used for manufacturing the IC.

The process next analyzes (at 430) the received design database for identifying patterns of polygons that matches criteria for resistance or capacitance extraction. As mentioned earlier, every conductor with resistivity is a resistor, while conductors in proximity with each other (e.g., overlap) form a capacitor. The process in some embodiments thus analyzes the polygon patterns for stretches of conductors and for conductors that overlap each other. In some embodiments, a pattern of polygons that match criteria for resistance extraction will be marked for resistance extraction, while a pattern of polygon that match criteria for capacitance will be marked for capacitance extraction. In the example of FIG. 3, the pattern of polygon 310 includes instances of both resistors and capacitors. The pattern of polygon 310 will thus be marked multiple times for multiple extractions of resistance and capacitance.

At 440, the process determines whether there are any resistors to be extracted. If there are resistors to be extracted, the process proceeds to 450. If there are no more resistors to be extracted, the process proceeds to 470 for capacitance extraction.

At 450, the process computes the resistance based on the 3D process description and the conductor type. In a pattern of polygons that matches the criteria for being a resistor, each polygon represents a conductor belonging to a particular conductor type. The process identifies the conductor type associated with the polygon and obtains the parameters associated with identified conductor from the 3D process description. Based on the obtained parameters for the identified conductor type, the process computes the resistance of the extracted resistor. As mentioned above, some of the conductor types have parameters based 3D geometries of the conductors (such as a cut-out tunnel). In these instances, the process calculates the resistance based those 3D geometries. The computation of resistance value based on 3D geometries of conductors will be further described below in Section II. The process then adds (at 460) the extracted resistor to the verification netlist and returns to 440. In some embodiments, once a resistance value for a particular 3D geometry (e.g., number of fins) and conductor type is computed, the computed value is cached and can be re-used to accelerate subsequent computation of resistance for similar geometry and conductor types.

At 470, the process determines whether there are any capacitors to be extracted. If there are capacitors to be extracted, the process proceeds to 480. If there are no more capacitors to be extracted, the process produces (at 495) the verification netlist and ends.

At 480, the process computes the capacitance based on the 3D process description and the conductor type. In a pattern of polygons that matches the criteria for being a capacitor, each polygon represents a conductor belonging to a particular conductor type. The process identifies the conductor type associated with the polygon and obtains the parameters associated with identified conductor from the 3D process description. Based on the obtained parameters for the identified conductor type, the process computes the capacitance of the extracted capacitor. As mentioned above, some of the conductor types have parameters based 3D geometries of the conductors (such as a cut-out tunnel). In these instances, the process calculates the capacitance based those 3D geometries. In some embodiments, once a capacitance value for a particular 3D geometry (e.g., number of fins) and conductor type is computed, the computed value is cached and can be re-used to accelerate subsequent computation of capacitance for similar geometry and conductor types.

After computing the capacitance value, the process adds (at 490) the extracted capacitor to the verification netlist and returns to 470.

Figure 5:
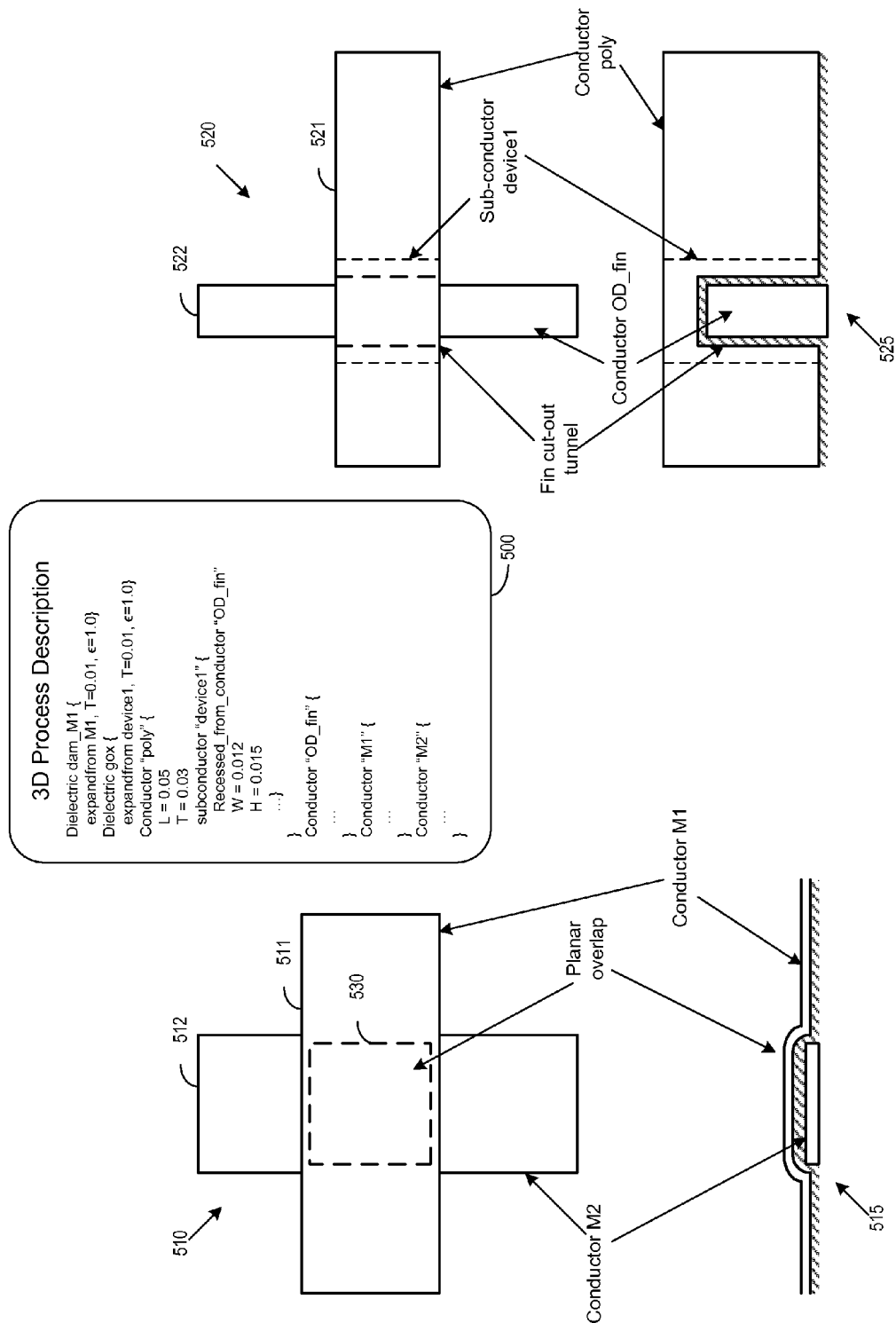
FIG. 5 illustrates how parameters associated with different conductor types in a process description file determine the computation of resistance and capacitance.

As mentioned above, some embodiments calculate the resistance and/or capacitance by identifying the conductor type and by looking up the parameters associated with the conductor type. FIG. 5 illustrates how parameters associated with different conductor types in a process description file 500 determine the computation of resistance and capacitance. As illustrated, the process description file 500 describes several types of physical elements. These types of physical elements are present in polygon patterns 510 and 520, which corresponds to capacitors 515 and 525, respectively.

The process description 500 includes descriptions for several types of physical elements under a given process technology. As illustrated, the process description 500 includes descriptions for dielectric type "dam_M1", dielectric type "gox", conductor type "poly", conductor type "OD_fin", conductor type "M1", and conductor type "M2". Some of these physical element types have parameters that refer to other physical element types. For example, the dielectric type "dam_M1" is "expanded from" the conductor type M1, and the dielectric type "gox" is "expanded from" the conductor type "OD_fin". Some of these physical element types have parameters that define the spatial relationship between itself and another type of conductor. For example, the sub-conductor type "device1" of the conductor type poly is "recessed from conductor" the conductor type "OD_fin". The description of the sub-conductor type also includes the dimensions of the corresponding cut-outs.

The capacitor 515 is a traditional planar capacitor formed by two overlapping conductors 511 and 512. The conductor 511 is of conductor type "M1", while the conductor 512 is of conductor type "M2". The process description 500 does not specify any special 3D relationship between conductor type M1 and conductor type M2. A RC extractor would therefore compute the capacitance of the capacitor 515 based on the size of the overlapping area 530, the thickness of the dielectric material separating M1 and M2, and the dielectric constant of that dielectric material. The size of the overlapping area 530 can be determined from the polygon pattern 510 (i.e., from a 2D design layout in a design database), while the information from the dielectric material would come from the process description file 500.

The capacitor 525 is a capacitor formed by a first conductor 521 recessing from a second conductor 522. The first conductor 521 is of the conductor type "poly" and includes a section with cut-out tunnels that is of the conductor type "device1". The second conductor 522 is of the conductor type "OD_fin". This is a capacitor that is present in every FinFET transistor. Its capacitance has to be determined three dimensionally since the height of the second conductor 522 is important. Specifically, the capacitance between the first conductor 521 and the second conductor 522 is determined based on the areas of all three surfaces (top, left and right) of the cut-out tunnel. Dimensions of these surfaces do not come from the 2D polygon pattern 520 (and therefore not from the design database). The RC extraction tool obtains these dimensions from the 3D process description file 500. Specifically, the relationship between the two conductors as well as the dimensions of the cut-out tunnel are obtained from the descriptions for the sub-conductor type "device1" and the conductor type "OD_fin". In some embodiments, the calculation of the capacitance for the capacitor 525 does not include the 2D overlap of the conductor 521 and 522 (i.e., the top surface of the cut-out), because the capacitance for that surface area is already separately extracted when the RC extraction tool extracts capacitance from 2D overlaps (such as for the capacitor 510).

Figure 6:
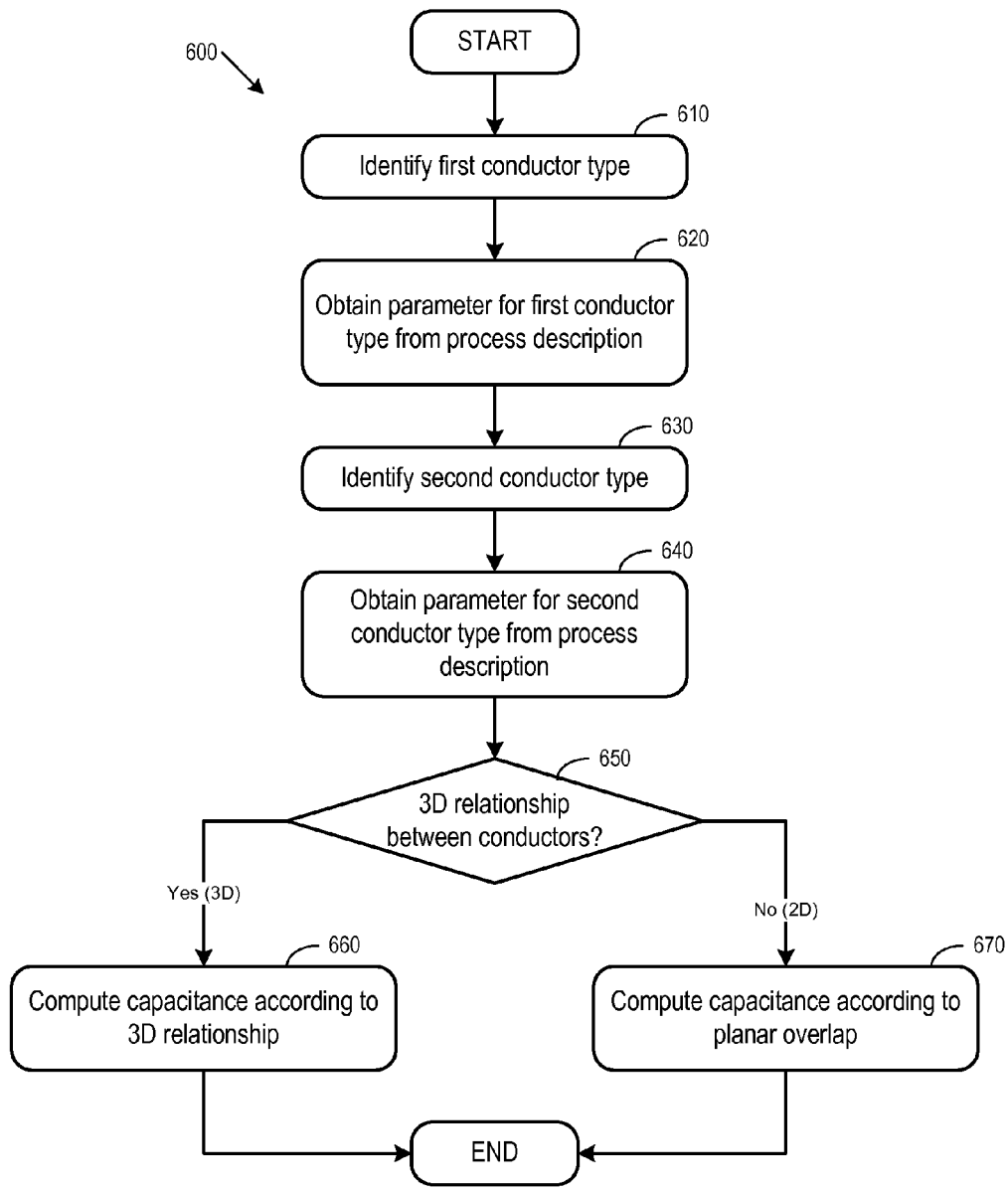
FIG. 6 conceptually illustrates a process that extracts capacitance from different types of conductors.

FIG. 6 conceptually illustrates a process 600 that extracts capacitance from different types of conductors. The process computes capacitance differently for capacitors with different conductor types. Specifically, the process computes capacitance three dimensionally when the conductor type that forms the capacitors is associated with three-dimensional parameters in the process description file (such as the geometries of the FinFET cut-out tunnel).

In some embodiments, this process is performed at operation 480 of the process 400 during which the RC extraction tool determine a capacitance value from a pattern of polygons. The process 600 starts after the RC extraction tool has analyzed the design database and identified polygon patterns that matches criteria for capacitance extraction. The process 600 will be described by referencing FIG. 5.

The process 600 identifies (at 610) the conductor type for a first conductor in the identified polygon pattern. For the polygon pattern 520 of FIG. 5, the process 600 identifies the conductor type of the conductor 521 as conductor "poly", and that it has a sub-section that is of the sub-conductor type "device1".

The process next obtains (at 620) parameters for the conductor type of the first conductor. For polygon pattern 520, the process 600 obtains from the process description file 500 the parameters for the conductor type "poly" (e.g., L, T) and for the sub-conductor type "device1" (e.g., W, H, and "recessed from conductor OD_fin").

The process then identifies (at 630) the conductor type for a second conductor in the polygon pattern from the design database and obtains (at 640) parameters for the conductor type of the second conductor. For the polygon pattern 520, the process 600 identifies the conductor type of the conductor 522 as conductor "OD_fin" and obtains from the process description file 500 the parameters for the conductor type "OD_fin".

Next, the process determines whether there is any 3D relationship between the first conductor and the second conductor. For the polygon pattern 510, the process is able to determine that there is no 3D relationship between conductor 511 and the conductor 512, since the conductor type of the conductor 511 (M1) and the conductor type of the conductor 512 (M2) has no 3D relationship according to the process description file 500. In contrast, for the polygon pattern 520, the process is able to determine that there is a 3D relationship between the conductor 521 and the conductor 522, because the conductor type of the conductor 521 (conductor "poly" and sub-conductor "device1") is recessed from the conductor type of the conductor 522 (conductor "OD_fin"). If the two conductors have a 3D relationship (i.e., non-planar) such as in the case of the FinFET polygon pattern 520, the process proceeds to 660. If the relationship between the two conductors is planar such as in the case of the polygon pattern 510 (simple overlap of M1 and M2), the process proceeds to 670.

At 660, the process computes capacitance value according to the 3D geometric relationship between the two conductors. For polygon pattern 520, the process 600 computes the capacitance based on the geometries of the cut-out tunnel. Specifically, the process would compute all three surface areas (top, left, and right) of the cut-out tunnel. The process would also obtain from the process description file 500 the thickness and dielectric constant of the dielectric material between the conductor type "OD_fin" and the sub-conductor type "device1". This information is obtained by the description of the dielectric type "gox" (gate oxide) in the process description file 500, which specifies the thickness of the dielectric material and its dielectric constant. The dielectric type "gox" also specifies that it is "expanded from" the sub-conductor type "device1".

At 670, the process computes the capacitance value according planar overlapping relationship between the two conductors. For polygon pattern 510, the process computes the capacitance based on the on the size of the overlapping area 530, the thickness of the dielectric material separating M1 and M2, and the dielectric constant of that dielectric material. The size of the overlapping area 530 can be determined from the polygon pattern 510 (i.e., from a 2D design layout in a design database). The information from the dielectric material would come from the process description file 500, which is included in the description for dielectric type "dam_M1".

After the capacitance has been computed, the process 600 ends.

In some embodiments, the description of physical element types in the process description file 500 is also used to determine resistance for different types of resistors. For example, to accurately compute the resistance of the conductor 521, the RC extraction tool needs consider the geometries of the cut-tunnel while calculating the resistance for the conductor 511 would not need such consideration. As in the case of capacitance calculation, the RC extraction tool uses the descriptions of the different conductor types in the process description file 500 to compute resistance. Specifically, the parameters of the sub-conductor type "device1" and of the conductor type "poly" informs the RC extraction tool of the geometry of the cut-out tunnel in the conductor 521, while the lack of such parameters for conductor type M1 informs the RC extraction tool that the resistance can be calculated two dimensionally.

Figure 7:
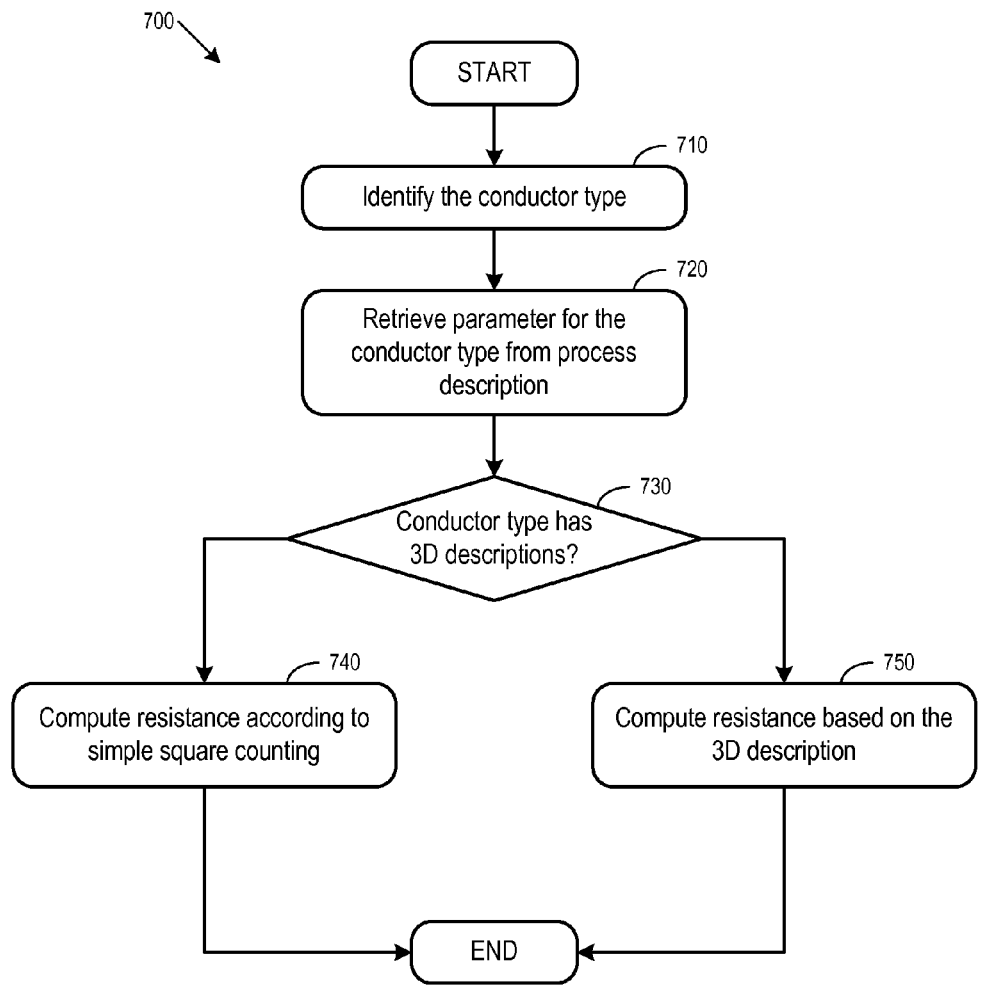
FIG. 7 conceptually illustrates a process that extracts resistance from different types of conductors.

FIG. 7 conceptually illustrates a process 700 that extracts resistance from different types of conductors. The process computes resistance differently for resistors based on different conductor types. Specifically, the process computes resistance three dimensionally when the conductor type of the conductor that forms the resistor is associated with three-dimensional parameters in the process description file (such as the geometries of the FinFET cut-out tunnel).

In some embodiments, the process 700 is performed at operation 450 of the process 400 during which the RC extraction tool determines a resistance value from a pattern of polygons. The process 700 starts after the RC extraction tool has analyzed the design database and identified polygon patterns that matches criteria for resistance extraction. The process 600 will be described by referencing FIG. 5.

The process 700 identifies (at 710) the conductor type for a conductor in the identified polygon pattern. For the polygon pattern 520 of FIG. 5, the process 700 identifies the conductor type of the conductor 521 as conductor "poly", and that it has a sub-section that is of the sub-conductor type "device1".

The process next obtains (at 720) parameters for the conductor type of the conductor. For polygon pattern 520, the process 600 obtains from the process description file 500 the parameters for the conductor type "poly" (e.g., L, T) and for the sub-conductor type "device1" (e.g., W, H, and "recessed from conductor OD_fin").

Next, the process determines whether the identified conductor type has any description of 3D geometries. For the polygon pattern 510, the process is able to determine from the process description file 500 that there is no 3D geometries to consider, since neither the conductor type of the conductor 511 (M1) and the conductor type of the conductor 512 (M2) has any parameters that needs to be considered three-dimensionally. On the other hand, for the polygon pattern 520, the process is able to determine that there are 3D parameters that need to be considered in order to accurately determine resistance values, because the conductor type of the conductor 521 (conductor "poly" and sub-conductor "device1") is recessed from the conductor type of the conductor 522 (conductor "OD_fin"). Such a recess results in cut-out tunnels that affect the calculation of resistance values for the conductor 521. If there are 3D parameters such as in the case of conductor type (sub-conductor "device1") for the conductor 521, the process proceeds to 750. If the conductor type for the conductor forming the resistor has no 3D parameters to consider (such as for conductor type M1 or M2), the process proceeds to 740.

At 740, the process computes the resistance value based on simple square counting method. In some embodiments, the process calculates the width and length of the conductor between the two contact terminals and then applies unit resistivity to determine resistance. This is known as square counting method, since the thickness of the conductor is uniform and every square of conductor can be treated the same. In some embodiments, the resistivity is obtained from the description of the conductor type (e.g., the resistivity of the conductor 511 can be obtained from the description for conductor type "poly".) After determining the resistance value, the process 700 ends.

At 750, the process computes resistance value according to the description of the 3D geometries in the process description file. In the example of FIG. 5, the conductor 521 has a FinFET cut-out, and the calculation of the resistance value for the conductor 521 consider the fact that the thickness of the conductor 521 different above the cut-out than elsewhere. This change of thickness can be determined from the parameters associated with the conductor type "poly" and the sub-conductor type "device1". Namely the process uses the parameters L, T, W, and H from the description of conductor type "poly" and "device1" to calculate the resistance of the conductor 521. Section II below will describe the determination of resistance value for conductors with FinFET cut-out in greater detail. After determining the resistance value, the process 700 ends.

FIGS. 1 and 3 above illustrate the process description file as a text or an ASCII file. In some embodiments, in order to speed up processing, the RC extraction tool does not import the description of process technology from the process description file directly. Instead, some embodiments use a process technology compiler to compile description file into a binary technology library that can be quickly utilized by the RC extraction tool. In some of these embodiments, the process technology compiler also performs at least a portion of the capacitance and/or resistance computation for each type of physical elements. The predetermined capacitance and/or resistance values are stored in the technology library so they can be retrieved by the RC extraction tool to accelerate the determination of capacitance/resistance values for the extracted capacitors/resistors.

In addition to receiving polygons from the 2D design layout from the design database, the 3D RC extraction tool in some embodiments also receives a set of designations that associate polygons with components. For example, the RC extraction tool in some embodiments receives a marking layer from the design database that associates polygons in the 2D design layout with individual components (e.g., FinFET transistors). These designations also facilitate the extraction of capacitance and resistance by e.g., indicating to the RC extraction tool which polygons have FinFET cut-out tunnels. In some embodiments, such component designations are provided by a LVS (layout-versus-schematic) netlist generated by a LVS checking software.

Figure 8:
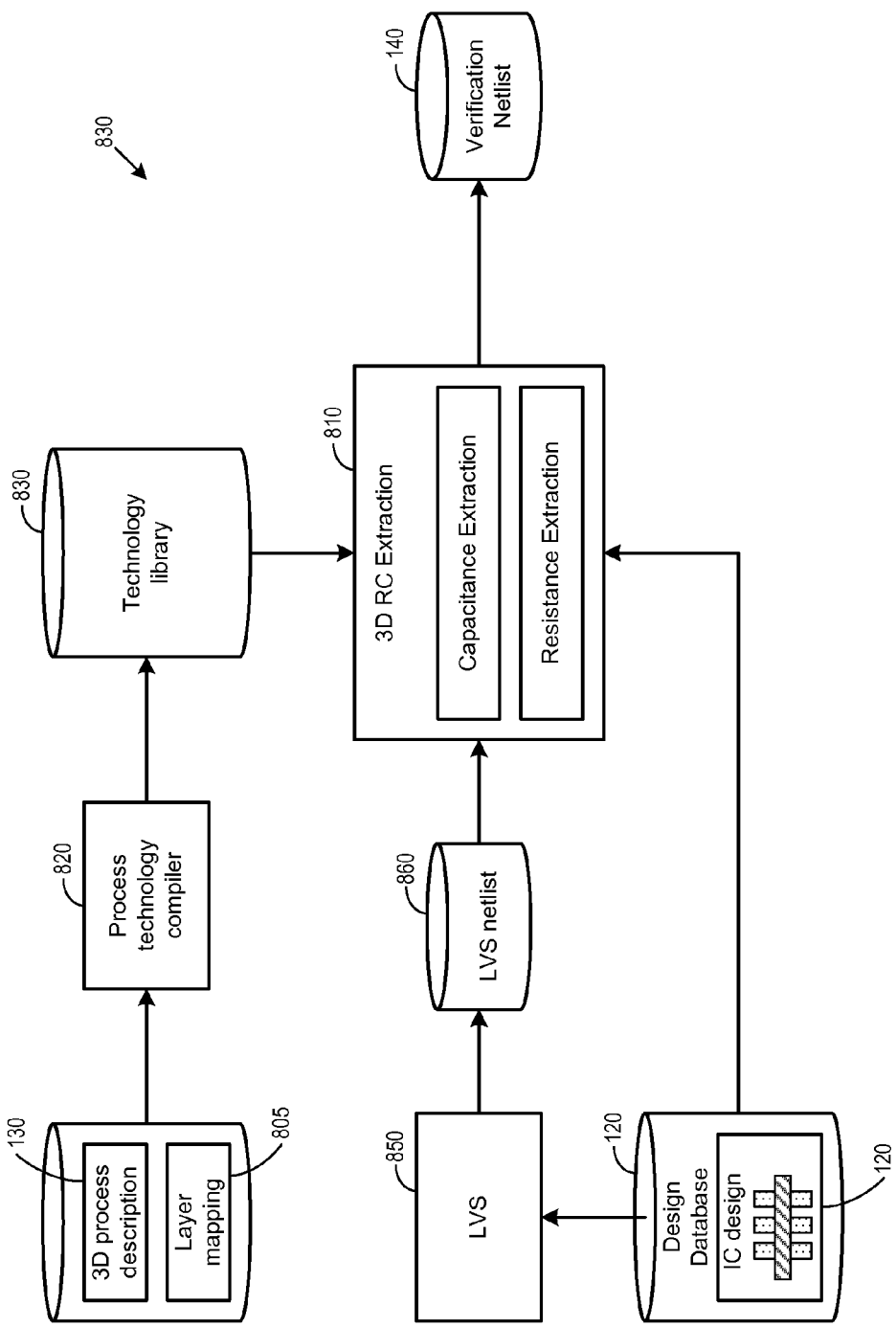
FIG. 8 illustrates an IC design flow for verifying an IC design under a 3D device process technology that uses compiled technology library and LVS netlist.

FIG. 8 illustrates an IC design flow 800 for verifying an IC design under a 3D device process technology that uses compiled technology library and LVS netlist. As illustrated, the design flow 800 is similar to the design flow 100 of FIG. 1 in which an 3D RC extraction tool 810 extracts capacitors and resistors from the IC design 105 stored in the design database 120 and generates the verification netlist 140. However, unlike the 3D RC extraction tool 110 of FIG. 1, the 3D RC extractor 810 of FIG. 8 uses a compiled technology library 830 and a LVS netlist 860 to extract capacitors and resistors from the IC design. The technology file is generated by a process technology compiler 820 from the 3D process description file 130 and a layer mapping file 805. The LVS netlist is generated by a LVS checking software 850 based on the data in the design database 120. In some embodiments, the LVS software also creates the marker layer that is used to mark the 2D position of the FinFET cutouts.

The layer mapping data 805 is used by some embodiments to map the various types of physical elements in the process description 130 to different layers of polygon in the design database 120. It is compiled into the technology library by the process technology compiler 820 to facilitate the operations of the 3D RC extraction tool 810. In some embodiments, the polygon layers in the design database 120 are named differently than the physical element types in the process description file 130. This is often the case because the vendor of the software tools used to create and generate the design database is not the same as the vendor of the process technology. The layer mapping provides the necessary mapping between polygon layers in the design database and the physical elements in the process description.

The process technology compiler 820 compiles the 3D process description file 130 into a binary technology library file for the 3D RC extraction tool 810. The compiler 820 also analyzes the descriptions of various physical element types in the process description file and computes generic unit resistance and unit capacitance for physical element types that have 3D parameters. The operations of the process technology compiler 830 will be further described below by reference to process 900 of FIG. 9.

The technology library 830 is generated by the technology compiler based on the 3D process description 130. Information in the technology library is in a format that is optimized for access and processing by the RC extraction tool 810. The technology library in some embodiments also includes layer mapping information from the layer mapping data 805. In some embodiments, the technology library also stores the generic unit capacitance and unit resistance for conductor types with 3D cut-outs.

The LVS netlist 860 is generated by the LVS checking software 850. The LVS checking software 850 recognizes the drawn shapes of the layout in the design database 120 that represent the electrical components of the circuit, as well as the connections between them. The generated LVS 860 netlist includes designations for the recognized electrical components and connections. This netlist will be used for comparison against a similar schematic or circuit diagram's netlist during the verification process for the IC design 105. By receiving the LVS netlist 860, the 3D RC extraction tool is able to associate polygons patterns in the 2D design layout in the design database 120 with electrical components in the IC design. Some embodiments in turn use the component designation in the LVS netlist to determine which polygon pattern is a FinFET and thus requiring handling 3D geometries of the FinFET cut-out tunnels.

The RC extraction tool 810 receives process description and layer mapping information from the technology library 830. The RC extraction tool also receives the IC design 105 in the form of a 2D design layout in the design database as well as component designations from the LVS netlist 860. In some embodiments, the RC extraction tool 810 uses information from a marking layer from the design database to associates polygons in the 2D device layout with components having 3D cut-outs, then retrieves the 3D parameters for the those conductor type from the technology library 830. The RC extraction tool uses the retrieved 3D parameters to compute the extracted capacitance and resistance values. The extracted capacitors and resistors are added or annotated into a final verification netlist.

In some embodiments, the RC extraction tool uses pre-computed unit capacitance or unit resistance values stored in the technology library to accelerate the computation of extracted capacitance or resistance values. The pre-computed unit capacitance or unit resistance enables the RC extraction tool to compute the 3D based capacitance/resistance value by simply adding or multiplying the generic unit capacitance/resistance value from the technology library with a variable quantity (e.g., width or length) specific to the IC design in the design database. The operations of the RC extraction tool 810 will be further described below by reference to process 1000 of FIG. 10.

Figure 9:
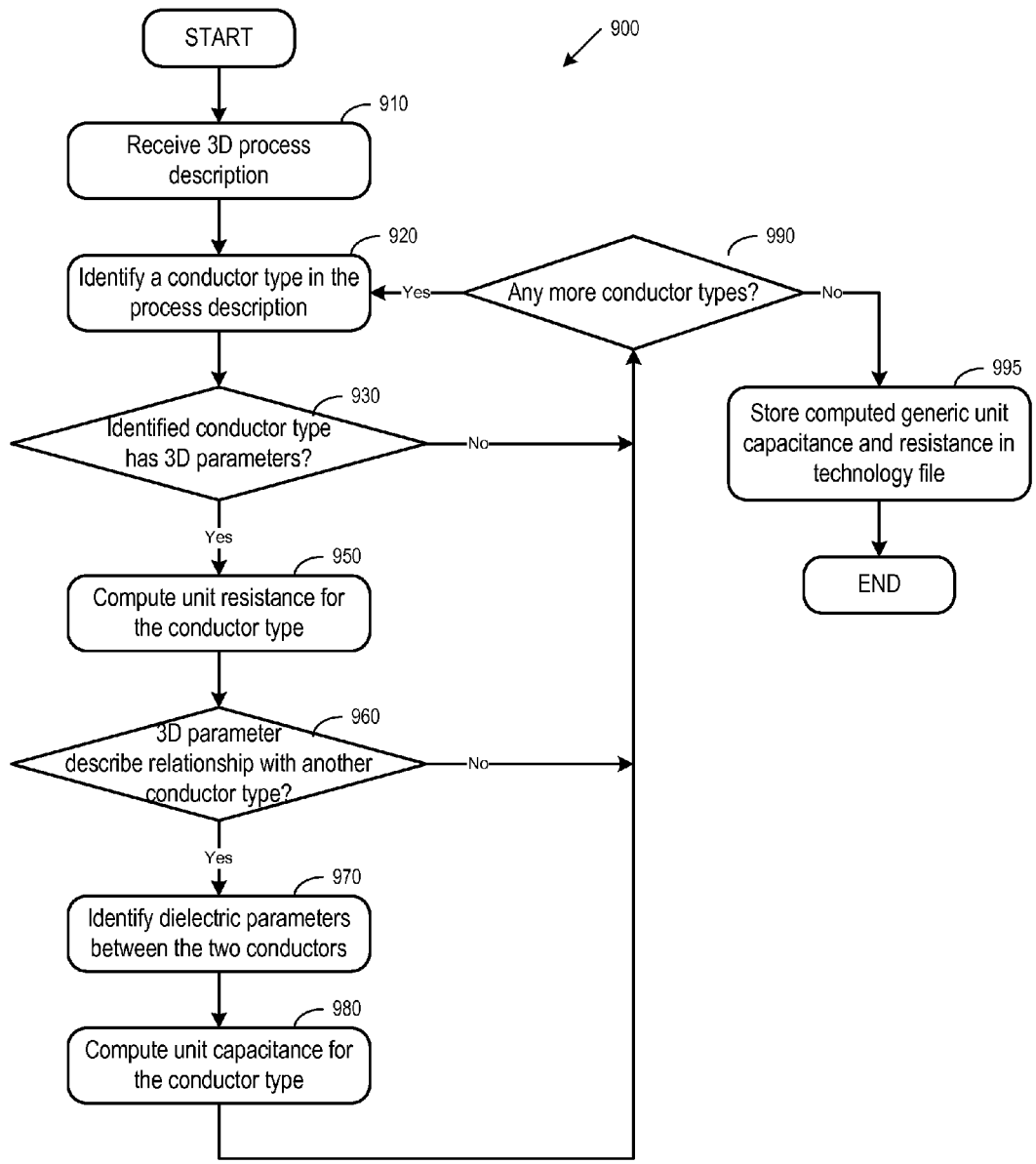
FIG. 9 illustrates a process for computing the generic unit capacitance and unit resistance.

For some embodiments, FIG. 9 illustrates a process 900 for computing the generic unit capacitance and unit resistance. This process is performed in some embodiments by the process technology compiler 830 when generating the technology library 830. The process 900 starts when the technology compiler is commanded to start generating the technology library.

The process receives (at 910) a 3D process description such as the process description file 130. The process description file includes parameters for several different types of physical elements provided by a given process technology. The process then identifies (at 920) a conductor type in the process description.

Next, the process determines (at 930) whether the identified conductor has any 3D parameters. Some embodiments make this determination by examine the conductor type itself. For example, the sub-type "device1" of the conductor "poly" discussed above is a conductor type that has 3D parameters. Some embodiments make this determination by examining the conductor for parameters that expresses a cut out due to recess from another conductor. Some embodiments make by examining whether the conductor type includes dimensions for a FinFET cut-out. If the conductor type has 3D parameters, the process proceeds to 950. If not, the process proceeds to 900 to determine if there are other conductor types to be examined.

At 950, the process computes the generic unit resistance for the conductor type. For a conductor with FinFET cut-out, this is computed in some embodiments according to the dimension of the FinFET cut-out that is common to all conductors belonging to this conductor type. For example, if all conductors belonging to sub-conductor type "device1" has one FinFET cut-out tunnel with dimensions L, W, and H, then the process will compute a resistance value based on these three dimensions regardless of other dimensions specific to individual IC design. The computation of the resistance value for a resistor with relevant 3D geometries will be further described below in Section II.

The process then determines (at 960) whether the 3D parameters associated with the conductor type describes relationship with another conductor type. For example, the sub-conductor type "device1" has a 3D relationship with the conductor type "OD_fin" because it includes a parameter "recessed from conductor OD_fin". If the conductor type's 3D parameter does describe such a relationship with another conductor type, the process proceeds to 970 to determine capacitance. If not, the process 900 proceeds to 990 to look for other conductor types.

The process identifies (at 970) dielectric parameters between the two conductor types for computing capacitance. In the example the process description 500 in FIG. 5, there is a layer of dielectrics between the sub-conductor "device1" and conductor "OD_fin" called "gox" (gate-oxide). The dielectric "gox" is "expanded from" device1 with thickness of 0.01 and dielectric constant of 1.0. The process identifies this dielectric type as the dielectric layer in the capacitor formed by the conductor "OD_fin" and the sub-conductor "device1".

The process next computes (at 980) the generic unit capacitance for a capacitor formed by the identified conductor type. For a conductor with FinFET cut-out, this is computed in some embodiments according to the dimensions of the FinFET cut-out that is common to all conductors belonging to this conductor type. For example, if all conductors belonging to sub-conductor type "device1" has one FinFET cut-out tunnel with dimensions L, W, and H, then the process will compute a capacitance value based on these three dimensions regardless of other dimensions specific to individual IC design.

The process next determines (at 990) if there are any more conductor types in the process description file that has yet to be examined. If so, the process returns to 920 to identify addition conductor types for determination of generic unit capacitance and/or resistance. If not, the process proceeds to 995.

At 995, the process stores the computed generic unit capacitance and resistance values in the technology file. In some embodiments, the computed generic unit capacitance and resistance values are stored in a structure that indexed by their associated conductor types such that the RC extraction tool can easily retrieve them. After storing the computed generic unit capacitance/resistance values, the process 900 ends.

Figure 10:
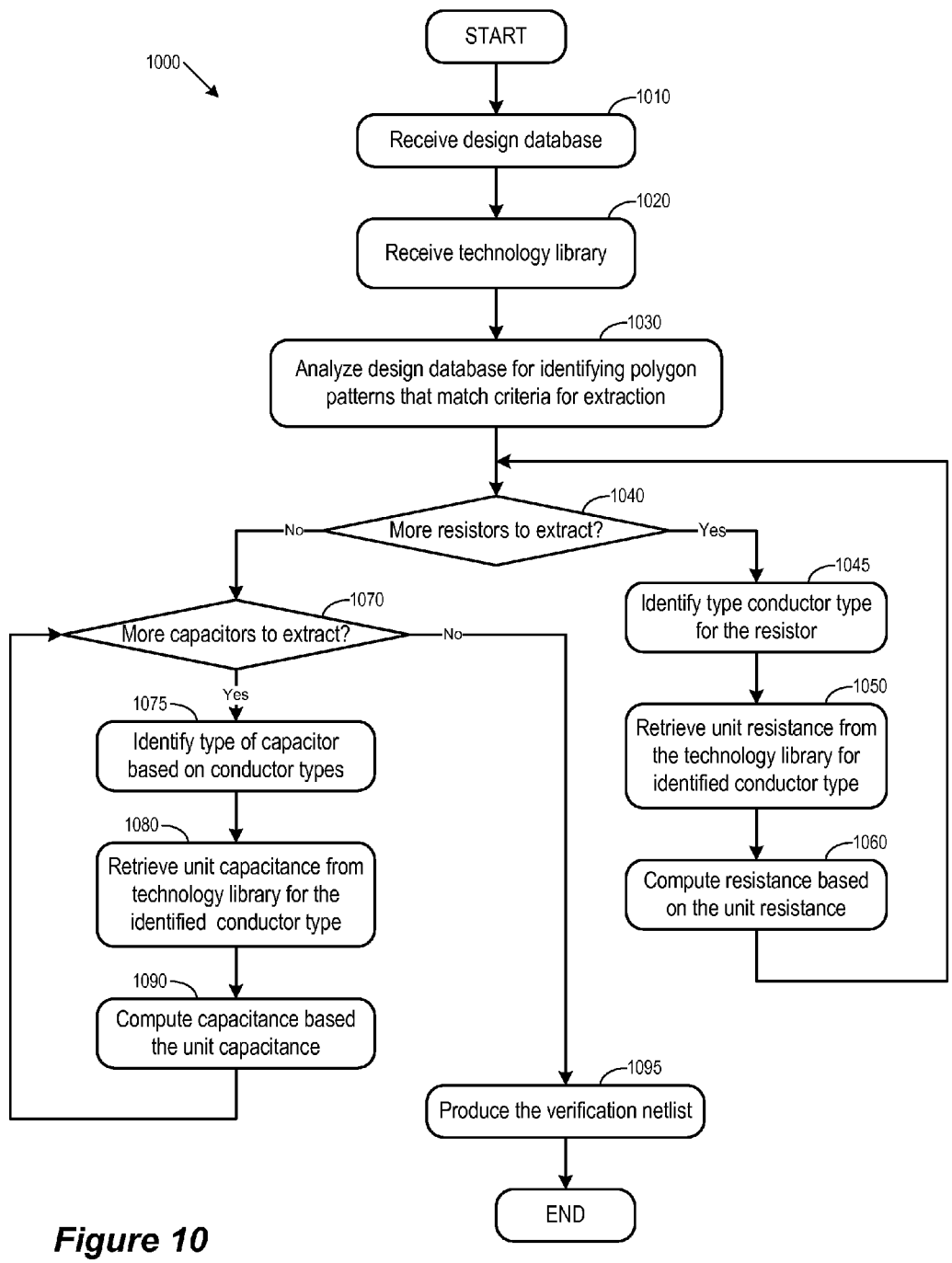
FIG. 10 conceptually illustrates a process for computing capacitance and resistance values based on the generic unit capacitance and resistance values stored in the technology library.

FIG. 10 conceptually illustrates a process for computing capacitance and resistance values based on the generic unit capacitance and resistance values stored in the technology library. In some embodiments, this process is performed by RC extractor tool 810 of FIG. 8, which uses the technology library 830 to extract capacitance and resistance from a 2D device layout in the design database 120. The process 1000 starts when the 3D RC extraction tool is launched. The process receives (at 1010) a design database for an IC design and receives (at 1020) a technology for the process technology that is to be used for manufacturing the IC.

The process next analyzes (at 1030) the received design database for identifying patterns of polygons that matches criteria for resistance or capacitance extraction. As mentioned earlier, every conductor with resistivity is a resistor, while conductors in proximity with each other (e.g., overlap) form a capacitor. The process in some embodiments thus analyzes the polygon patterns for stretches of conductors and for conductors that overlap each other. In some embodiments, a pattern of polygons that match criteria for resistance extraction will be marked for resistance extraction, while a pattern of polygon that match criteria for capacitance will be marked for capacitance extraction.

At 1040, the process determines whether there are any resistors to be extracted. If there are resistors to be extracted, the process proceeds to 1045. If there are no more resistors to be extracted, the process proceeds to 1070 for capacitance extraction.

At 1045, the process identifies the conductor type of the polygon marked for resistor extraction. In some embodiments, the technology library stores the generic unit resistance for some or all of the conductor types. By identifying the conductor type for resistor extraction, the process in some embodiments will be able to retrieve the unit resistance for the conductor type using the conductor type as an index.

Next, the process retrieves (at 1050) unit resistance from the technology library for the identified conductor type. In the example of a resistor formed by a conductor belonging to conductor type "poly" and sub-conductor type "device1" as in the example of FIG. 5, the process retrieves the generic unit resistance associated with the sub-conductor type "device1" from the technology library.

The process then computes (at 1060) the resistance based on the retrieved unit resistance. The unit resistance of a particular conductor type is common to all resistors formed of the conductors of that particular type. However, a conductor forming an extracted resistor may have specific geometries that is uniquely specified by the user design and not necessarily in common with other conductors of the same type. For example, a generic unit resistance for a particular conductor type may specify resistance for only a section of a conductor whose resistance computation is dependent on the FinFET cut-out. To complete computation of the resistance, the process computes resistance value for other sections of the conductor, whose resistance value is not dependent on the FinFET cut-out (e.g., being too far away from the cut-out). The process then adds the resistance value for those other sections of the conductor with the unit resistance. As another example, a generic unit resistance may only specify resistance based on only two dimensions of the FinFET cut-out (e.g., only the height H and width W of FIG. 2) while letting the third dimension (e.g., the length L of FIG. 2) to be a particular unit value since the third dimension is not common to all conductors of this type. In this case the process would compute the actual resistance value by multiply the generic unit resistance by the actual third dimension of the conductor in the IC design.

In some embodiments, a generic unit resistance value may specify a resistance value for only a particular number of fins (e.g., 3 fins), and the technology library includes generic resistance values for only some particular number of fins (e.g., 3 fins and 5 fins). The process 1000 in some of these embodiments determines the actual resistance value for a different number of fins (e.g., 2 fins or 7 fins) by extrapolating or interpolating from the available generic resistance values (e.g., extrapolate the resistance value for a 7-fin FinFET based on generic resistance values for a 3-fin FinFET and a 5-fin FinFET.)

At 1070, the process determines whether there are any capacitors to be extracted. If there are capacitors to be extracted, the process proceeds to 480. If there are no more capacitors to be extracted, the process produces (at 1095) the verification netlist and ends.

At 1075, the process identifies the conductor type of the polygon marked for capacitor extraction. In some embodiments, the technology library stores the generic unit capacitance for some or all of the conductor types. By identifying the conductor type for capacitance extraction, the process in some embodiments will be able to retrieve the unit capacitance for the conductor type using the conductor type as an index.

Next, the process retrieves (at 1080) unit capacitance from the technology library for the identified conductor type. In the example of a capacitor formed by a conductor belonging to conductor type "poly" and sub-conductor type "device1" as in the example of FIG. 5, the process retrieves the generic unit capacitance associated with the sub-conductor type "device1" from the technology library.

At 1090, the process computes the capacitance based on the 3D process description and the conductor type. The unit capacitance of a particular conductor type is common to all capacitance formed of the conductors of that particular type. However, a conductor forming an extracted capacitor may have specific geometries that are uniquely specified by the user design and not necessarily in common with other conductors of the same type. For example, a generic unit capacitance for a particular conductor type may specify capacitance for only a section of a conductor whose capacitance computation is dependent on the FinFET cut-out. To complete computation of the capacitance for the extracted capacitor, the process computes capacitance value for other sections of the conductor, whose capacitance value is not dependent on the FinFET cut-out (e.g., being too far away from the cut-out). The process then adds the capacitance for those other sections of the conductor with the unit capacitance. As another example, a generic unit capacitance may only specify capacitance based on only two dimensions of the FinFET cut-out (e.g., only the height H and width W of FIG. 2) while letting the third dimension (e.g., the length L of FIG. 2) to be a particular unit value since the third dimension is not common to all conductors of this type. In this case the process would compute the actual capacitance value by multiplying the generic unit capacitance by the actual third dimension of the conductor in the IC design.

In some embodiments, a generic unit capacitance value may specify a capacitance value for only a particular number of fins (e.g., 3 fins), and the technology library includes generic capacitance values for only some particular number of fins (e.g., 3 fins and 5 fins). The process 1000 in some of these embodiments determines the actual capacitance value for a different number of fins (e.g., 2 fins or 7 fins) by extrapolating or interpolating from the available generic capacitance values (e.g., extrapolate the capacitance value for a 7-fin FinFET based on generic capacitance values for a 3-fin FinFET and a 5-fin FinFET.)

After computing the capacitance value, the process produces (at 1095) the verification netlist that includes the extracted capacitors and resistors. The process 1000 then ends.

Figure 11:
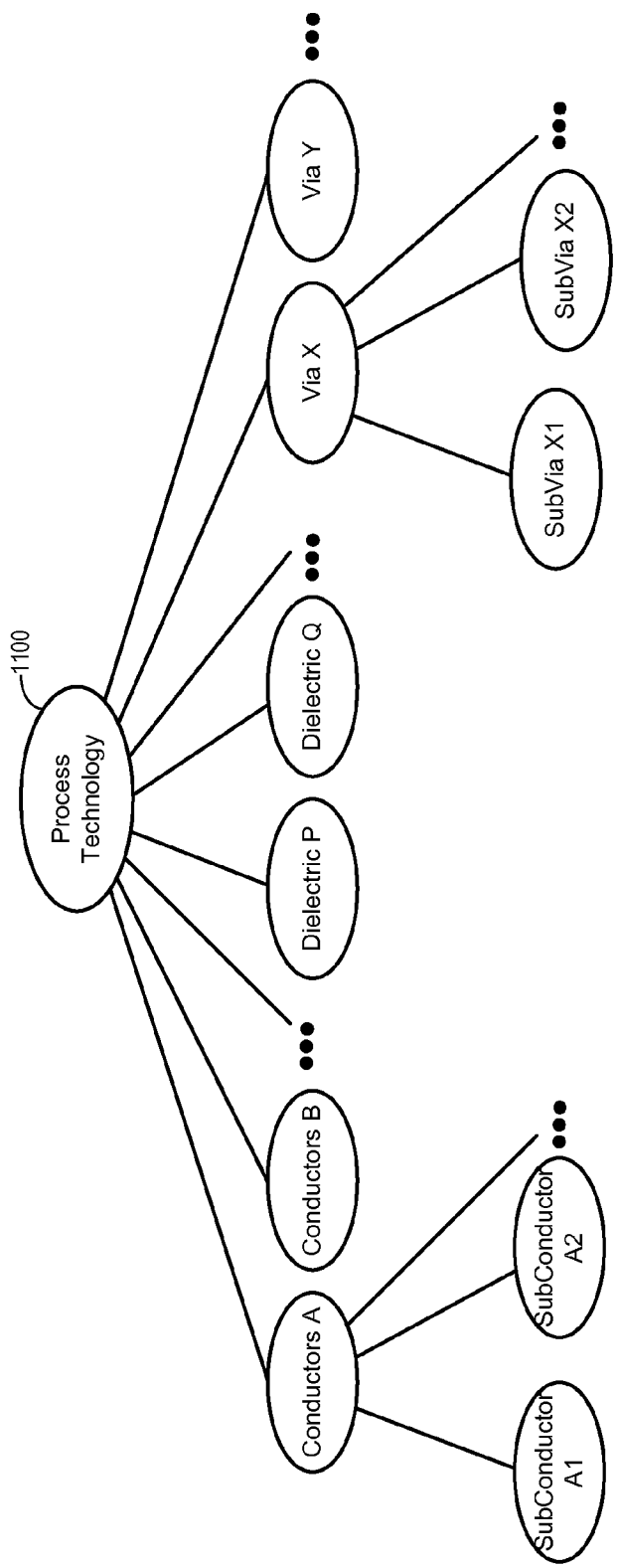
FIG. 11 illustrates a hierarchy of physical elements under a particular process technology.

The process description files 130 and 500 are examples of process description that includes description for some types of conductors and dielectrics. In some embodiments, these descriptions are organized into a hierarchy of objects, where each object corresponds to a set descriptions or parameters for a particular physical element type. Some of the modularized descriptions include one or more sub-objects corresponding to sub-types of the physical element type. FIG. 11 illustrates a hierarchy of physical elements under a particular process technology 1100. The process technology 1100 has three categories of physical elements: conductors, dielectrics, and vias. A process description for the process technology 1100 can include one or more types of conductors, one or more types of dielectrics, and one or more types of vias. In some embodiments, each conductor type can include one or more sub-conductor types, and each via type can include one or more sub-via types. In some embodiments, each sub-type inherit the parameters from its parent type (e.g., Sub-conductor A1 inheriting parameters from conductor A), but a sub-type may include one or more parameters that override parameters inherited from its parent type.

Figure 12:
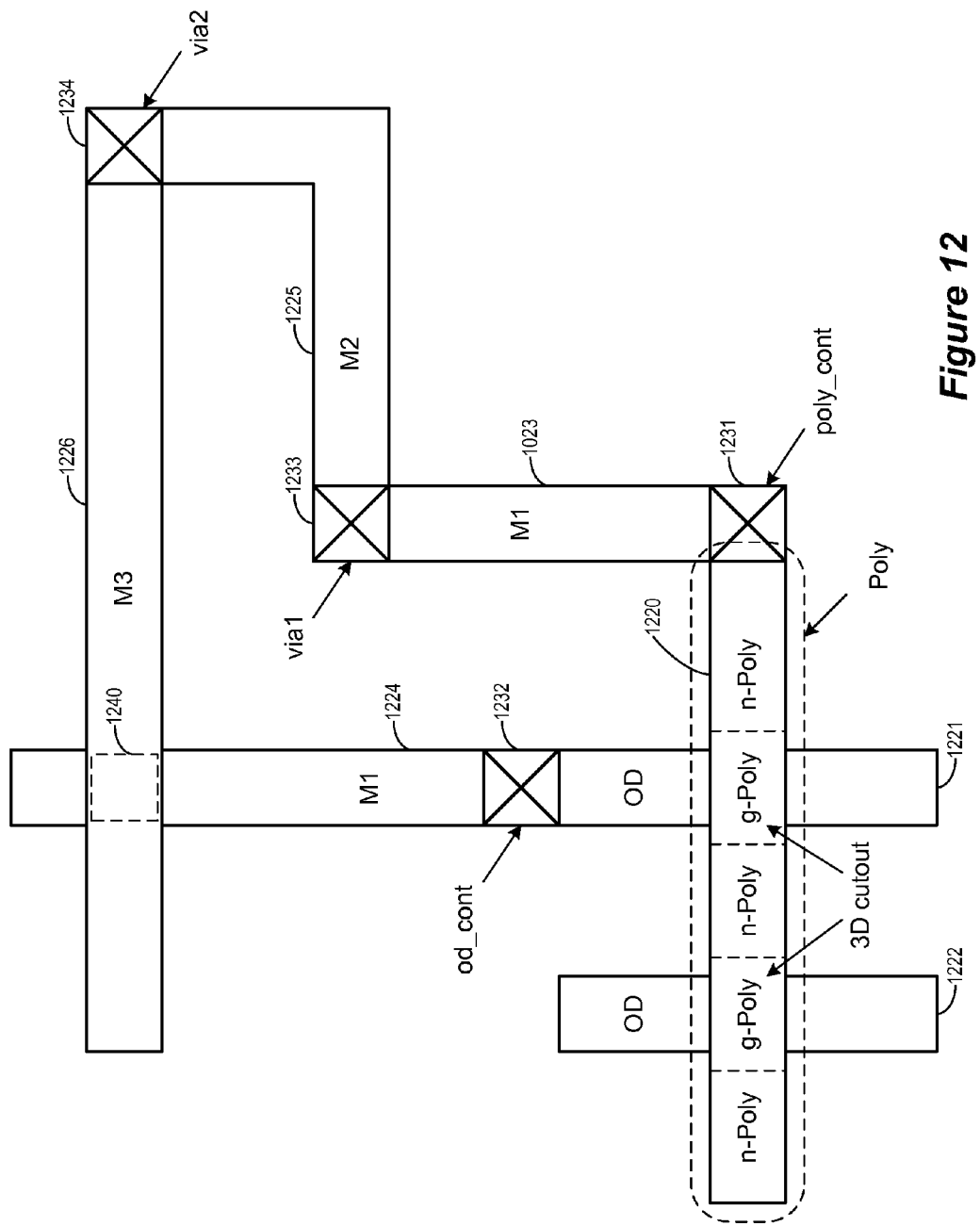
FIG. 12 illustrates an example 2D device layout of an IC design that is targeted for a particular process technology.
Figure 13:
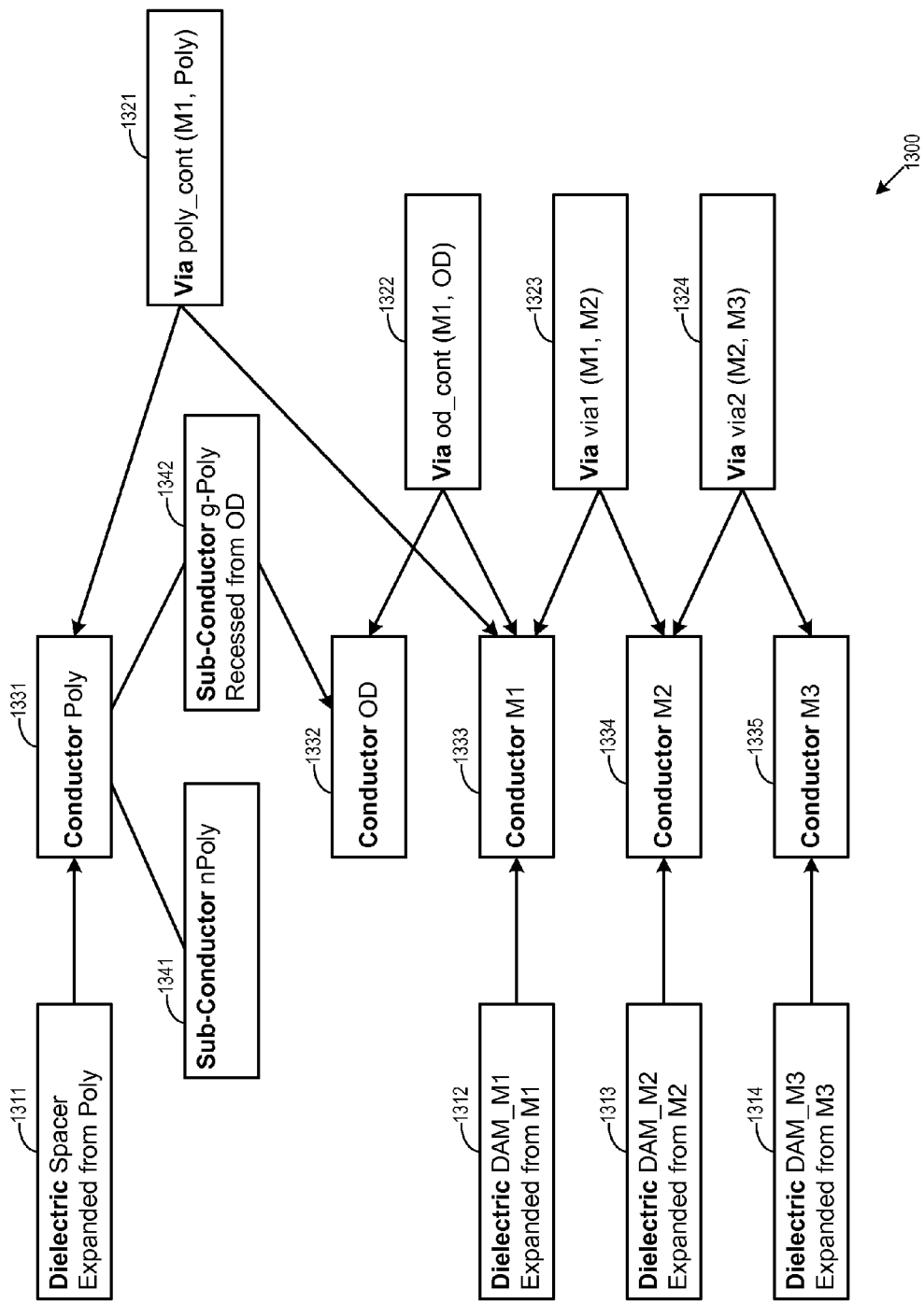
FIG. 13 conceptually illustrates a process description that includes the relationships between the various types of physical elements that are present in the example 2D device layout of FIG. 12.

The process description for a technology also details relationships between different types of physical element (i.e., between different objects or sub-objects of the process description). For example, the sub-conductor "device1" in the process description file 500 has a relationship with the conductor type "OD_fin" in that "device1" is recessed from "OD_fin". Other relationships between the different physical element types are also present in the process description in some embodiments. FIGS. 12 and 13 illustrates how relationships between different physical element types are used to express relationships between different physical elements in an IC design.

FIG. 12 illustrates an example 2D device layout 1200 of an IC design that is targeted for a particular process technology. The 2D device layout 1200 includes polygons that represent various physical elements such as conductors 1220-1226 and vias 1231-1234. These physical elements belong to several types, including conductor type "M1" (polygons 1223 and 1224), conductor type "M2" (polygon 1225), conductor type "M3" (polygon 1226), conductor type "poly" (polygon 1220), and conductor type "OD" (polygon 1221-1222). The conductor 1220 of the conductor type "poly" has sections that belong to sub-conductor types "n-poly" and "g-poly".

The 2D device layout also includes several overlaps. The overlap 1240 is between conductors 1226 and 1224. The overlap 1234 is between the conductors 1226 and 1225. The overlap 1233 is between the conductors 1225 and 1023. The overlap 1232 is between the conductors 1224 and 1221. The conductor 1220 also overlaps conductors 1221 and 1222. However, the overlaps 1234, 1233, 1232, and 1231 are occupied by polygons that are labeled as vias. Specifically, the overlap 1231 has a via of type "poly_cont", the overlap 1232 has a via of type "od_cont", the overlap 1233 has a via of type "via1", and the overlap 1234 has a via of type "via2".

FIG. 13 conceptually illustrates a process description 1300 that includes the relationships between the various types of physical elements that are present in the example 2D device layout 1200. The process description 1300 is not illustrated as a text file like the process description files 130 and 500, but one of ordinary skill would understand that the process description 1300 can be expressed textually.

As illustrated, there are a number of objects in the process description 1300 corresponding to a number of physical element types. These objects correspond to dielectric types 1311-1314, via types 1321-1324, and conductor types 1331-1335. The object for the conductor type 1331 in particular includes two sub-objects for sub-conductor types 1341 and 1342.

The process description 1300 also includes the relationships between the various objects. When the process description is used by the RC extractor to extract capacitors and resistors from the 2D device layout 1200, the relationships included in the process description 1300 are used to determine the capacitance and resistance values. In this conceptual illustration, an arrow from a first object to a second object indicates that the relationship between the two physical element types is recorded or stored in the first object.

Each object for the dielectric types 1311-1314 are associated with a conductor type. Specifically, the dielectric "spacer" is "expanded from" conductor "poly" (1331), the dielectric "DAM_M1" is "expanded from" conductor "M1" (1333), the dielectric "DAM_M2" is "expanded from" conductor "M2" (1334), the dielectric "DAM_M3" is "expanded from" conductor "M3" (1334). Thus, for example, to determine a capacitor formed by conductor M1 (such as the overlap between the M1 conductor 1224 and the M3 conductor 1226 in the 2D device layout 1200), the RC extraction tool would identify dielectric "DAM_M1" as the dielectric material that conform to the conductor M1, and that its thickness and dielectric constant is relevant to the determination of the capacitance. Though not illustrated, the process description in some embodiments also includes descriptive objects for dielectric types that do not conform to a particular type of conductor, but are present everywhere on the IC. The parameters of these dielectrics would be used for capacitance calculation for some conductor types.

Each object for the via types 1321-1324 are associated with two conductor types, since each via is for connecting two conductors from two different layers (and hence different types). Specifically, the via type "poly_cont" is for connecting conductors "M1" and "poly", the via type "od_cont" is for connecting "M1" and "OD", the via type "via1" is for connecting "M1" and "M2", and the via type via2 is for connecting "M2" and "M3". Thus, when processing the polygon 1234 in the 2D device layout 1200, a software tool (such as RC extraction tool) would know that the polygon has electrically connected the conductor 1226 (conductor type M3) and the conductor 1225 (conductor type M2), since the polygon 1234 is of the via type "via2".

Conductor types 1332-1335 do not have sub-conductor types, while the conductor type 1331 has two sub-conductor types 1341 and 1342. The sub-conductor type 1342 ("g-poly" or gate-polysilicon) is recessed from the conductor type OD. Thus, when processing the polygon 12220 in the 2D device layout 1200, a software tool (such as RC extraction tool) would know that the subsections of the polygon 1220 with sub-conductor type "g-poly" is recessed from conductors 1221 and 1222 (conductor type OD). The example process description 1300 describes only relationships that references conductors instead of sub-conductors. However, process description in some embodiments also allows relationships that references sub-conductors.

Figure 14:
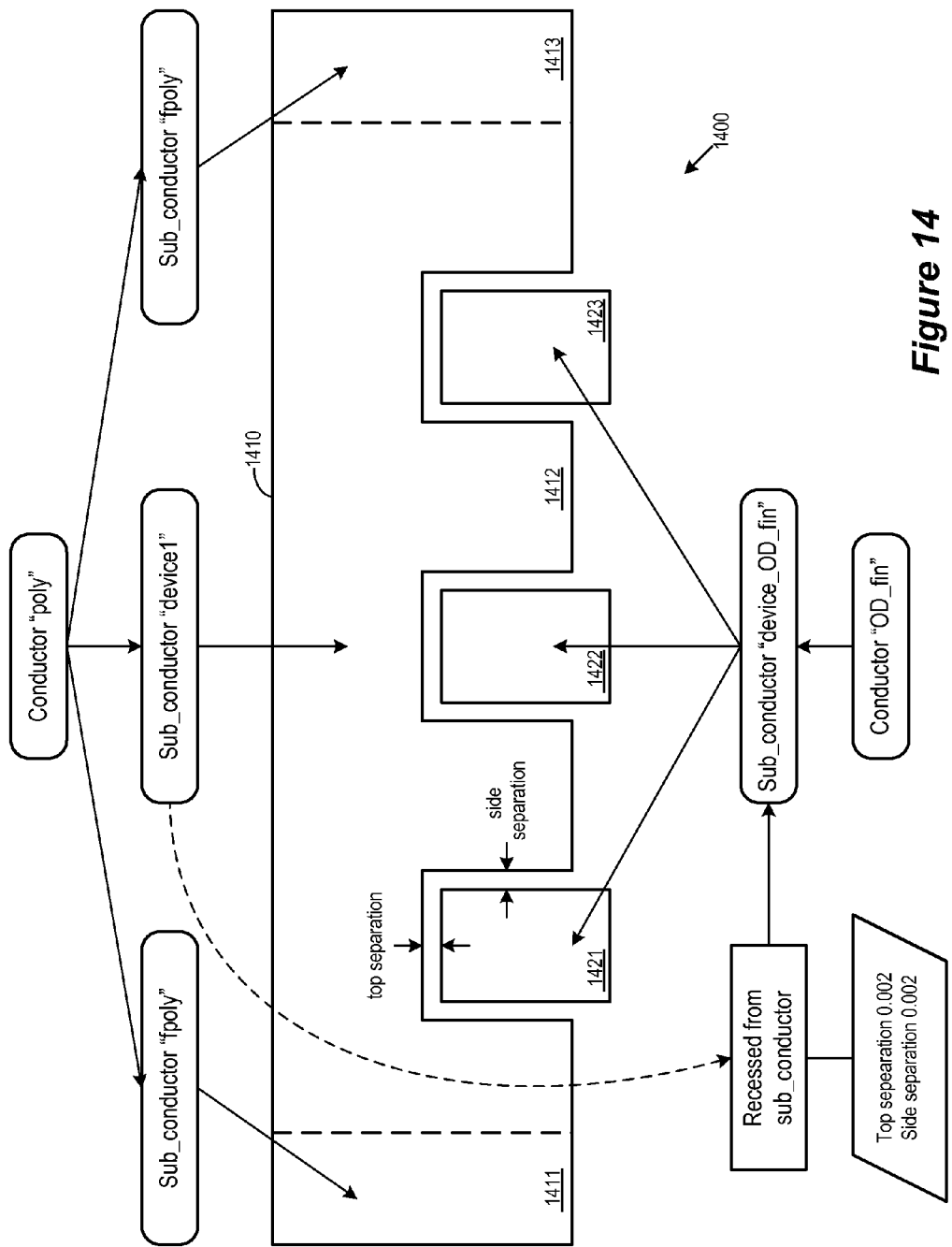
FIG. 14 illustrates a FinFET device that includes a polysilicon conductor that is recessed from three diffusion conductor (fins).
Figure 15:
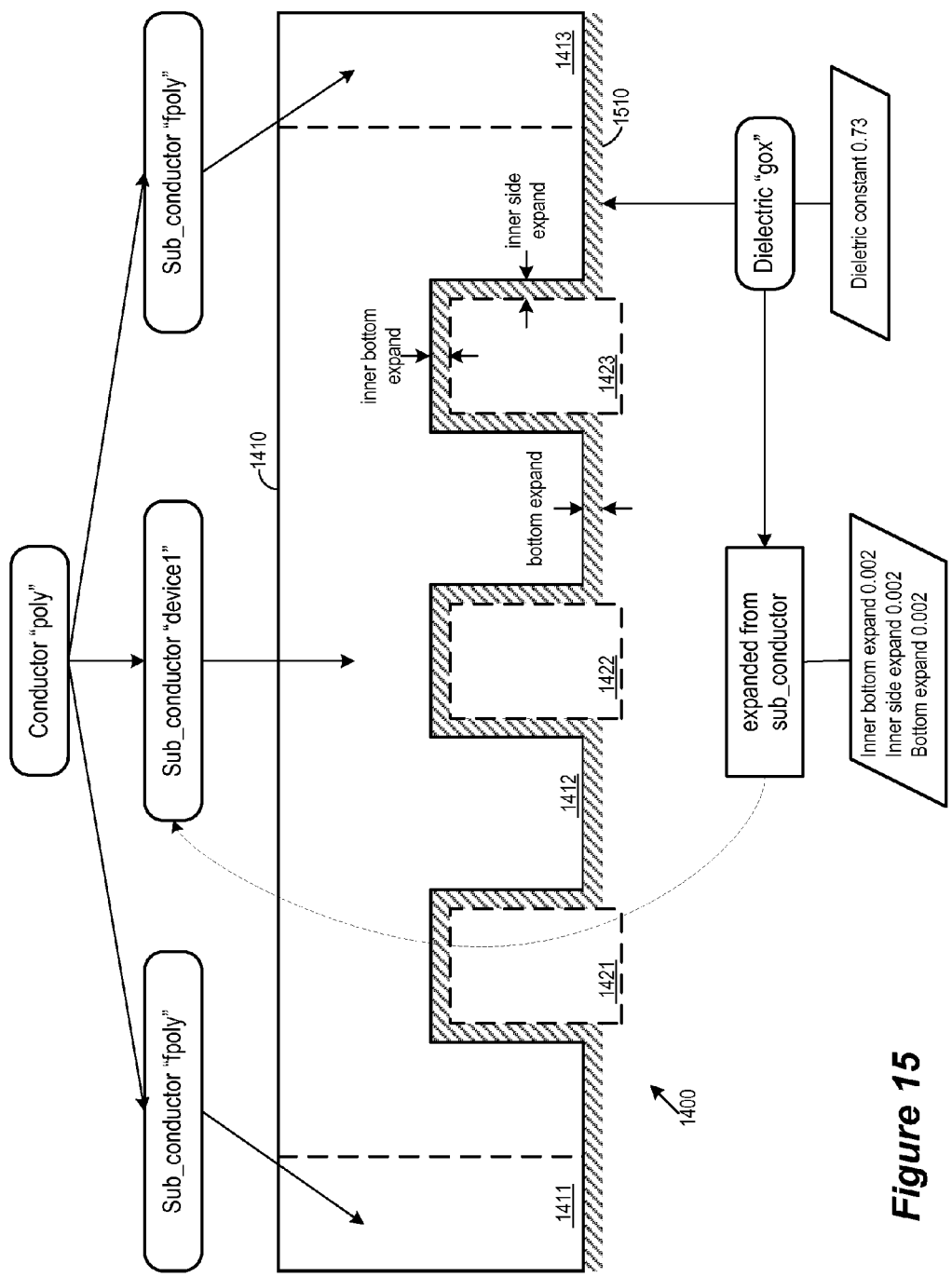
FIG. 15 illustrates a dielectric layer separating the two types of conductors in the FinFET device.

FIGS. 14-16 below illustrates parameters in a process description that describes the geometries of FinFET cut-outs. FIG. 14 illustrates a FinFET device 1400 that includes a polysilicon conductor 1410 that is recessed from three diffusion conductor 1421-1423 (fins). The polysilicon conductor 1410 is divided into sections 1411-1413. The section 1412 is recessed from the three diffusion fins 1421-1423.

The polysilicon conductor 1410 is of the conductor type "poly". The sections 1411 and 1413 are of the sub-conductor type "fpoly", and section 1412 is of the sub-conductor type "device1". The diffusion conductors is of the conductor type "OD_fin", while the fins that fit into the recess of the polysilicon conductor 1410 are of the sub-conductor type 'device_OD_fin". The parameters of the sub-conductor type "device1" indicates that it is recessed from sub-conductor "device_OD_fin", and that the separation between the two sub-conductors are 0.002 at the top and 0.002 at the sides. In some embodiments, sub-conductor types such as "device1" and "device_OD_fin" are used by the design database to mark a section of a conductor as being part of a transistor device. In this instance, "device1" marks the section of the polysilicon conductor that has FinFET cut out, while "device_OD_fin" marks the fins of diffusion conductor that fit into the FinFET cut out. The sub-conductor types "device1" and "device_OD_ fin" thus marks the most relevant portion of the FinFET transistor device (its gate and drain-source channel).

FIG. 15 illustrates a dielectric layer separating the two types of conductors in the FinFET device 1400. As mentioned earlier, the section 1412 of the conductor 1410 is recessed from the conductor fins 1421-1423. A dielectric layer 1510 that conform to the bottom surface areas of the conductor 1410 (i.e., along the FinFET cut out) is present. The dielectric layer is of the type "gox" (gate oxide) with the dielectric constant of 0.73. Its inner bottom expand (thickness along the top surface of the FinFET cut-out) is 0.002. Its inner side expand (thickness along the side surfaces of the FinFET cut-out) is 0.002. Its bottom expand (thickness along the bottom of the polysilicon conductor 1410) is 0.002.

FIG. 16 illustrates a portion of an example process description file 1600 that can be used by a RC extraction tool to determine the 3D geometries of the FinFET 1400. The process description file 1600 includes descriptions for the conductor "OD_fin", the conductor "poly", and the dielectric "gox" as shown in FIGS. 13 and 14. The description for the conductor "poly" in particular includes description for the sub-conductor type "device1", which includes the sub-conductor's recessing relationship with the sub-conductor "device_OD_fin". The description also includes the separation between the two sub-conductors.

Figure 17:
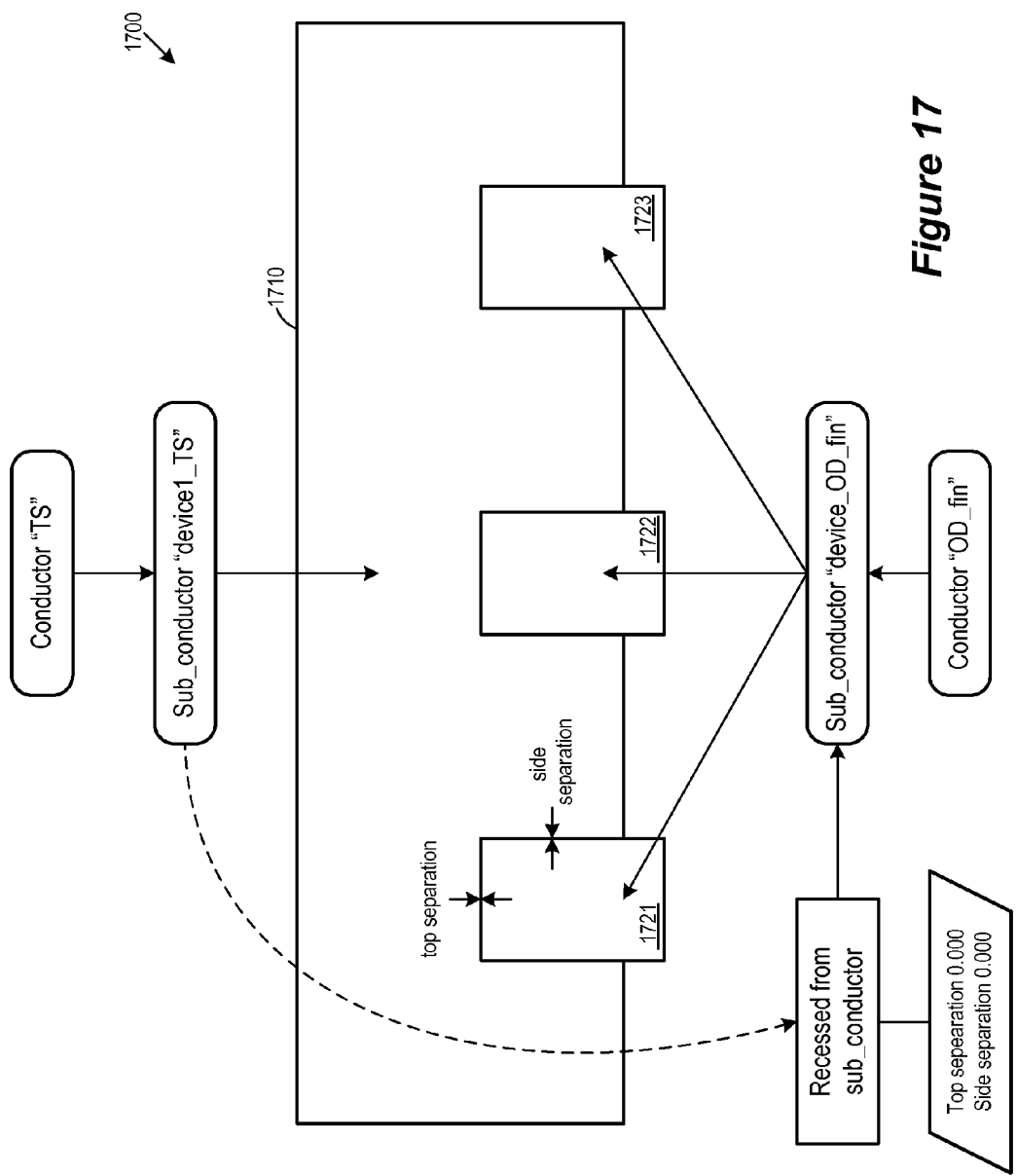
FIG. 17 illustrates a device for which the process description uses zero separation to indicate electrical contact between two different conductor types.

In some embodiments, the separations between sub-conductors can be set to zero by the process description in order to indicate that the two conductor types have electrical contact. FIG. 17 illustrates a device 1700 for which the process description uses zero separation to indicate electrical contact between two different conductor types. The device 1700 includes a conductor 1710 of conductor type "TS". The conductor type TS includes a sub-conductor type "device1_TS" that specifies FinFET type cut outs. The conductor 1710 is recessed from the conductor fins 1721-1723, which are of conductor type "OD_fin" and sub-conductor type "device_ OD_fin". The sub-conductor "device1_TS" is recessed from the sub-conductor "device_OD_fin". However, process description specifies that the separation between the two types of sub-conductors is zero. A software tool (such as a RC extraction tool or LVS software) processing an overlap of sub-conductor "device1_TS" and of sub-conductor "device_OD_fin" would treat such an overlap as an electrical connection.

II. Resistance Extraction

As mentioned above, to compute resistance in a conductor that includes FinFET type cut-outs require the 3D geometries of the FinFET cut-out be considered. In some embodiments, a RC extraction tool (such as 110 of FIG. 1) or a process technology compiler (such as 810 of FIG. 8) use the parameters in the process description to determine the exact 3D shapes of the conductor in order to accurately determine the resistance value. This section describes the computation of resistance value that is performed in operation 750 of FIG. 7 and operation 950 of FIG. 9 in some embodiments.

Figure 18:
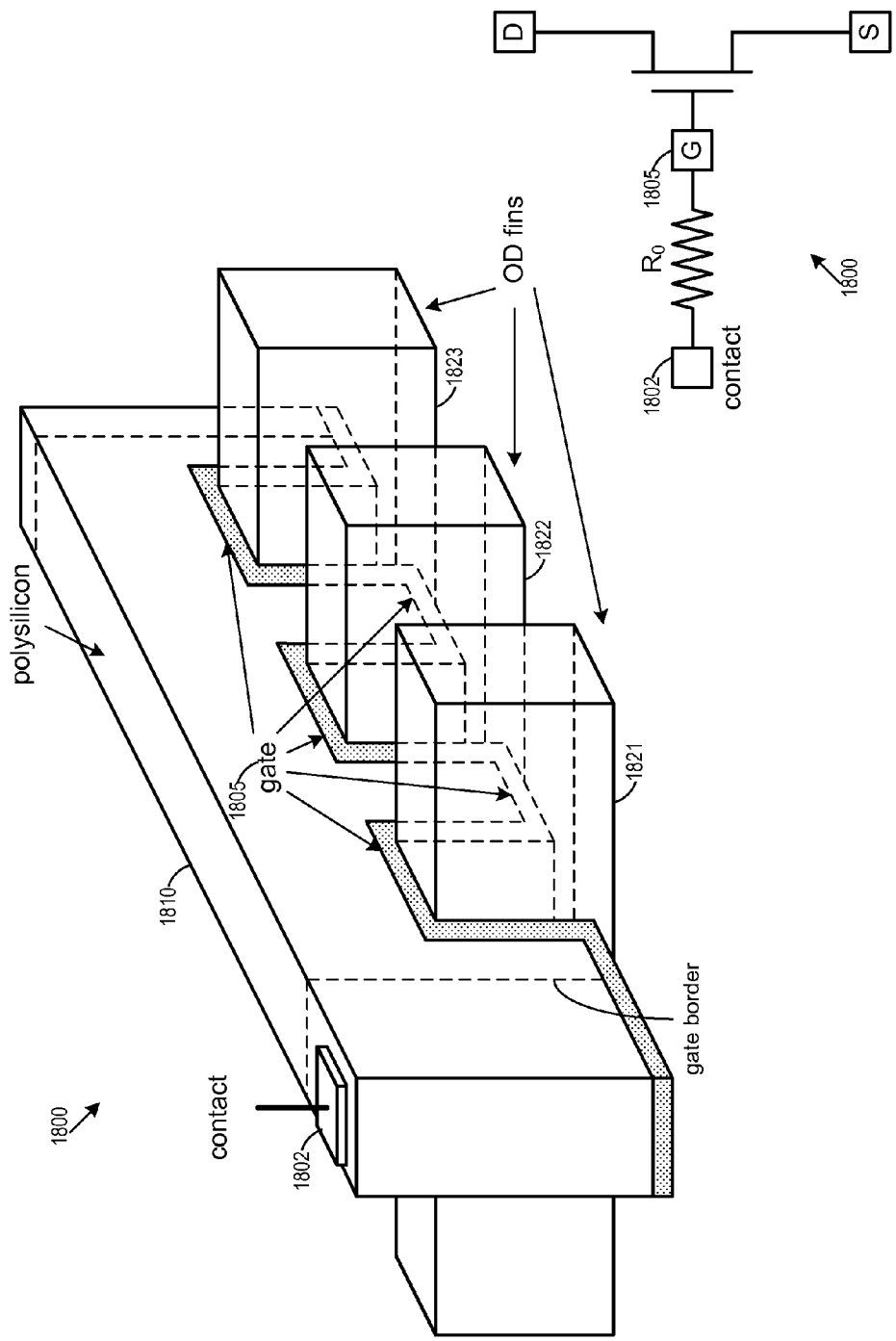
FIG. 18 illustrates a FinFET device for which a resistance value between a contact terminal and the actual gate terminal of the FinFET depend on 3D geometries of the FinFET cut-outs.

FIG. 18 illustrates a FinFET device 1800 for which a resistance value between a contact terminal 1802 and the actual gate terminal of the FinFET 1800 depend on 3D geometries of the FinFET cutouts. As illustrated, the FinFET 1800 includes a polysilicon conductor 1810 and three diffusion conductor fins (OD fins) 1821-1823. The common surface areas between the polysilicon conductor and the diffusion conductor fins form the channel (or the gate terminal) of FinFET device 1800. Since polysilicon, unlike metal, has relatively high resistivity, the resistance value between the contact terminal 1802 at the polysilicon and the actual gate terminal of the FinFET 1800 is appreciable. Furthermore, this value is dependent upon the geometries of the cut-outs formed by the recessing polysilicon 1810 in favor of the diffusion fins 1821-1823. The corresponding circuit diagram for the FinFET 1800 shows the position of this resistance value $R_0$ in relation to the contact terminal 1802 and the actual gate 1805 of the FinFET 1800.

Figure 19:
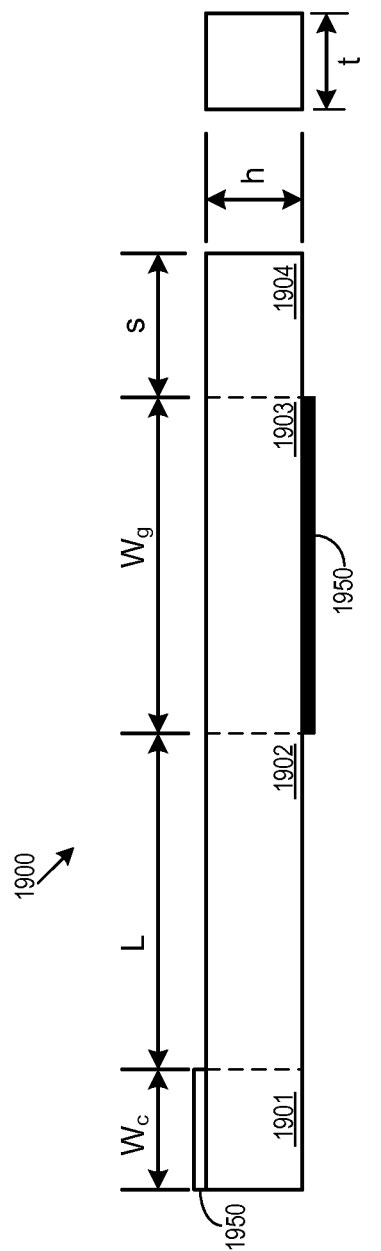
FIG. 19 illustrates different equations for computing the resistance of a conductor by treating FinFET devices as simple FETs.

Different embodiments compute the resistance value for the extracted resistor differently. FIG. 19 illustrates different equations 1910, 1920, and 1930 for computing the resistance (i.e., $R_0$ of FIG. 18) of a conductor 1900 by treating FinFET devices as simple FETs. Specifically, the equations are for computing the resistance value from a contact terminal 1950 to the actual gate terminal 1955 of a FET transistor formed by the conductor 1900. These equations are dependent on the geometries of the conductor 1900, but not on the geometries of the cut-outs.

As illustrated by the side view of the conductor 1900, the height of the conductor 1900 is "h" and the thickness (or depth) of the conductor 1900 is "t". The conductor 1900 is divided into several sections 1901, 1902, 1903, and 1904. The section 1901 is defined by the contact terminal 1950, the top surface of the section being in contact with the contact terminal 1950. The section 1902 corresponds to a stretch of the conductor between the contact and the actual gate 1955. The section 1903 corresponds to the gate terminal of the FET device. The last section 1904 corresponds to a section of the conductor 1900 that is beyond the gate of the FET. The width of the contact section 1901 is $W_c$. The width of the in-between section 1902 is L. The width of the actual gate section 1903 is $W_g$. The width of the beyond-the-gate section 1904 is "s".

The equation 1910 calculates the resistance by performing square counting. The result resistance $R_{sq}$ is based on a distance between the midpoint of the contact (i.e., the mid-point of the section 1901) to the midpoint of the gate (i.e., the mid-point of the section 1903). This distance is thus Wc/2+L+Wg/2. Multiplying the resistivity Rs with this distance between mid-points and dividing the product by the thickness "t" yields the resultant resistance $R_{sq}$ of the square counting method of equation 1910.

The equation 1920 calculates the resistance by using a formula based on BSIM (Berkeley Short-channel IGFET Model) models of FETs. This equation is similar to the square counting equation 1910, except that the relevant distance for resistance calculation is from the mid-point of the contact section 1901 to the one-third point of the gate section 1903. The distance for resistance calculation is thus Wc/2+L+Wg/3. Multiplying the resistivity Rs with this distance and dividing the product by the thickness "t" yields the resultant resistance $R_{BSIM}$ of based on BSIM model of equation 1920.

The equation 1930 calculates the resistance by using an equivalent distance value (rsolver) that is calculated by a numerical solver. Some embodiments apply the numerical solver by setting the voltage at the contact 1950 to 0 volt and setting the voltage at the gate 1955 to 1 volt. Some embodiments apply the numerical solver by setting the voltage at the contact 1950 to 0 volt while assuming the current density entering the gate of the FET to be uniform. Once the equivalent distance value (rsolver) produced by the solver is calculated, some embodiments calculate the resultant resistance $R_{solver}$ based on the numerical solving method by multiplying the resistivity Rs with the equivalent distance value and the ratio "h/t".

Instead of calculating the resistance between the contact and gate by utilizing models for simple FETs, some embodiments calculates the gate resistance (i.e., the resistance between the contact and the gate) by taking the geometry of the FinFET cut-out into consideration. Specifically, the variation in thickness due to the FinFET cut-out will be used to determine the gate resistance.

Figure 20:
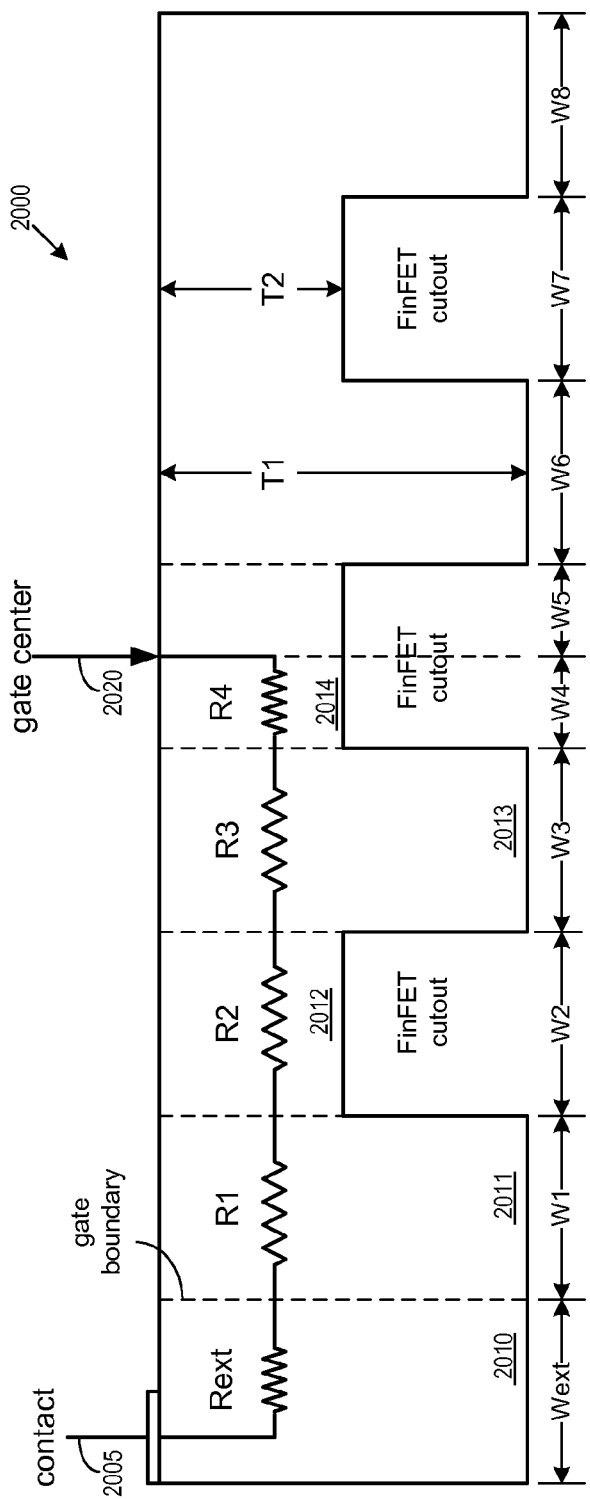
FIG. 20 illustrates the calculation of gate resistance for a polysilicon in a FinFET by using a modified square counting method.

FIG. 20 illustrates the calculation of gate resistance for a polysilicon 2000 in a FinFET by using a modified square counting method. As illustrated, the polysilicon 2000 has several cut-outs, which causes the thickness of the polysilicon to vary between thickness T1 and T2. The cut-outs also divide the polysilicon into several sections, the thickness of the polysilicon remaining constant within a same section. To calculate the equivalent gate resistance from the contact 2005 to the gate of the FinFET, some embodiments calculate the resistance for each section of the polysilicon 2000 based on the thickness (either T1 or T2) and the width of the (W) of the section. To obtain the gate resistance for the FinFET, some embodiments sum the resistance values of sections from the contact 2005 to a gate center 2020. In some embodiments, the gate center is defined by the geometric center of the FinFET gate (typically at the middle of cut-outs).

In the example of FIG. 20, the gate resistance of the FinFET formed by the polysilicon 2000 will be computed by summing the resistance values Rext, R1, R2, R3, and R4, which are the resistance values of the sections 2010, 2011, 2012, 2013, and 2014 respectively. Rext is also the resistance value between the contact 2005 and a defined gate border of the FinFET device, while R4 is the resistance value of the section 2014 that is defined at one end by a side of a FinFET cutout while at the other end by the gate center 2020. The resistance value of each of the sections 2010-2014 is computed based on the thickness and the width of the section. Thus, to compute resistance R2 for the section 2012, some embodiments multiply the resistivity of the polysilicon 2000 with the width of the section 2012 (W2) and divide by the thickness of the section 2012 (T2).

To compute the gate resistance value based on the geometries of the FinFET cut-outs by using the modified square counting method described by reference to FIG. 20 requires little computing resource. Some embodiments on the other hand use more computation intensive methods to obtain the gate resistance value that more accurate. In some of these embodiments, a numerical solver is used to compute the gate resistance of the FinFET based on the cut-out from the polysilicon.

Figure 21A:
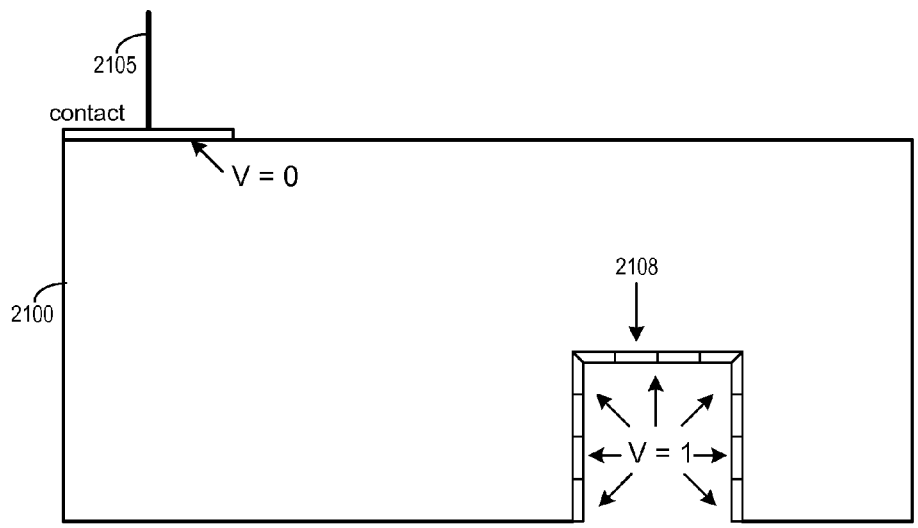
FIG. 21a illustrates a numerical solver that determines the gate resistance by setting the voltage at the surface of the contact to zero and the voltage at each unit surface area to 1.
Figure 21B:
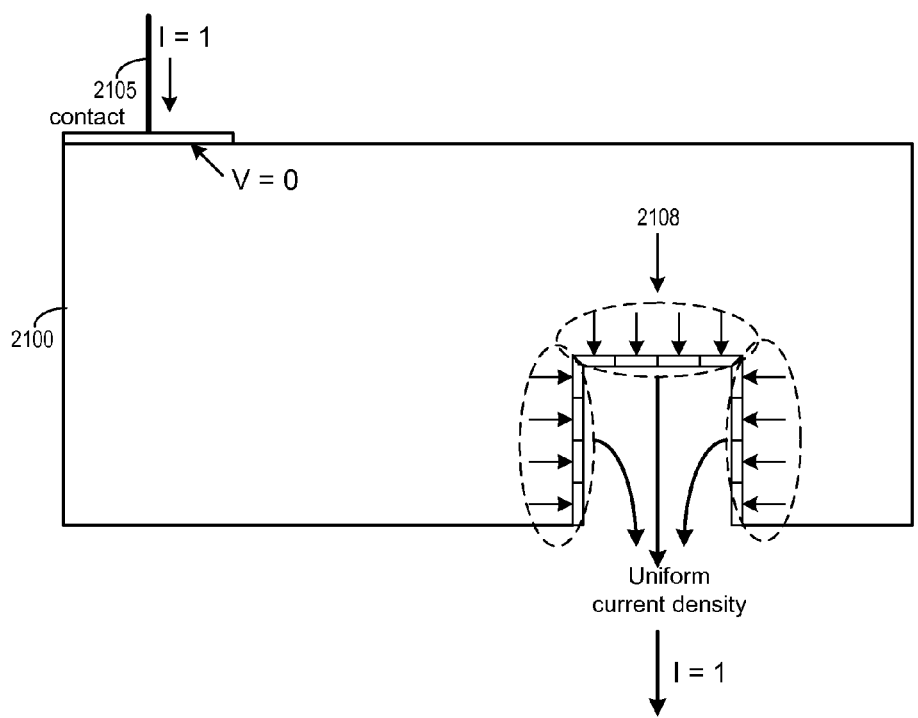
FIG. 21b illustrates a numerical solver that compute the gate resistance by setting uniform current to each of the unit surface areas.

FIGS. 21a-b illustrates two different numerical solvers for a polysilicon 2100 with a FinFET cut-out. The numerical solvers determine the gate resistance from a contact 2105 to the gate 2108 of a FinFET device based on the geometry of the FinFET cut-out 2108. In some embodiments, the entire surface area of the FinFET cut-out is considered as the gate of the FinFET device, and the numerical solver performs calculation by dividing the cut-out surface area into smaller units. The calculation is then based on the spatial coordinate of each of these smaller units of cut-out (or FinFET gate) surface areas. In some embodiments, the numerical solver is given the following parameters to account for the geometry of the cut-out: (i) number of fins (three in the example of FIG. 18; one in the example of FIG. 21); (ii) the location of the first fin; (iii) the width of each fin; and (iv) the spacing between two neighboring fins.

FIG. 21a illustrates a numerical solver that determines the gate resistance by setting the voltage at the surface of the contact 2105 to zero and the voltage at each unit surface area to 1. To determine the gate resistance, the solver in some embodiments determines current to each of the unit surface area. The gate resistance is then computed by dividing the uniform voltage by the average of the currents at the different unit surface areas.

Instead of setting uniform voltage to each of the unit surface areas, some embodiments of the solver compute the gate resistance by setting uniform current to each of the unit surface areas. FIG. 21b illustrates such a numerical solver for some embodiments. The numerical solver sets the voltage at the contact 2105 to zero and the current I entering the contact 2105 to 1. The numerical solver also sets the total current I exiting the cut-out (i.e., gate) to 1. The current density across all unit surface areas at the FinFET cut out is uniform, i.e., the current entering each of the unit surface areas are the same. Namely, if and $L_{interface}$ is the total surface area of the FinFET cut-out and $J_n$ is the current component perpendicular to each of the unit surface areas, then $J_n=1/L_{interface}$.

Some embodiments treat a current as a vector, and only the current vector that is perpendicular to the unit surface areas is required to be uniform, while the current vector that is parallel to the unit surface area may vary between different unit surface areas. To determine the gate resistance, the solver in some embodiments determines voltage $V_i$ at each of the unit surface areas by solving a Laplace boundary value problem. The gate resistance is then computed by dividing the average of the voltages at the different unit surface areas by the total current (I=1).

In some embodiments, the gate resistance is computed by calculating Joule loss of the polysilicon. The Joule loss is calculated as $P=R_0*I^2$, where P is the Joule loss of the polysilicon, I is the total current entering and leaving the polysilicon (which is set to 1 as discussed above), and $R_0$ is a per unit gate resistance value between the contact and the gate surface (cut-out). The Joule loss P, however, also equals to the total power flowing through the cut-out (i.e., the sum of the power flowing through the unit surface areas). Since the power flowing through each of the unit surface area can be computed as the product of the solved voltage at the unit surface area ($V_i$) multiplied by the current component perpendicular to the unit surface area ($J_n$), the per unit gate resistance value $R_0$ is simply equal to the total power flowing through the cut-out when the total current I is set to 1. The gate resistance value is then computed by multiplying $R_0$ with the sheet resistance of the polysilicon.

Figure 22A:
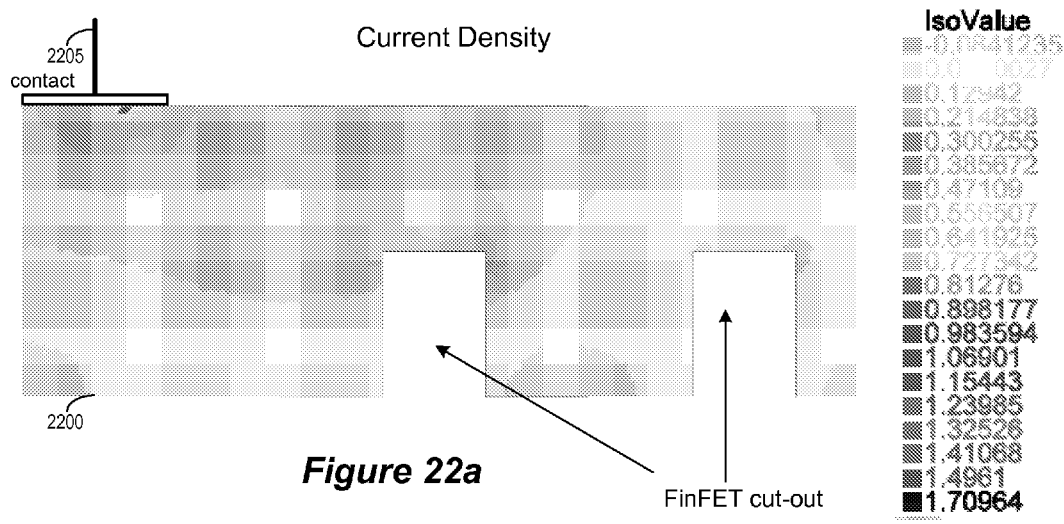
FIG. 22a-b illustrates the operations of a numerical solver that sets uniform current density at the gate surface area.
Figure 22B:
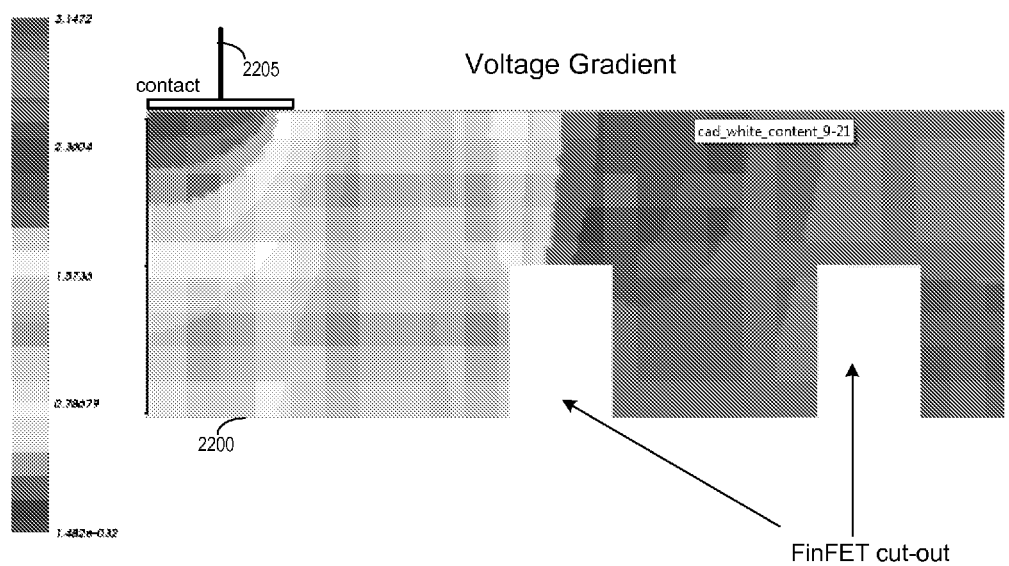

FIG. 22a-b illustrates the operations of a numerical solver that sets uniform current density at the gate surface area (i.e., the numerical solver of FIG. 21b). The numerical solver is determining the gate resistance of a two-fin FinFET device from a contact 2205 to the gate formed by the FinFET cut-out. FIG. 22a illustrates the current density from the contact 2205 to the FinFET cut-outs, while FIG. 22b illustrates the voltage gradient from the contact 2205 to the FinFET cut-outs. The current densities shown in FIG. 22a reflect the absolute value of the currents traveling through the polysilicon 2200 rather than the current vector entering the FinFET surface area (hence the current density of FIG. 22a does not appear uniform).

Figure 23:
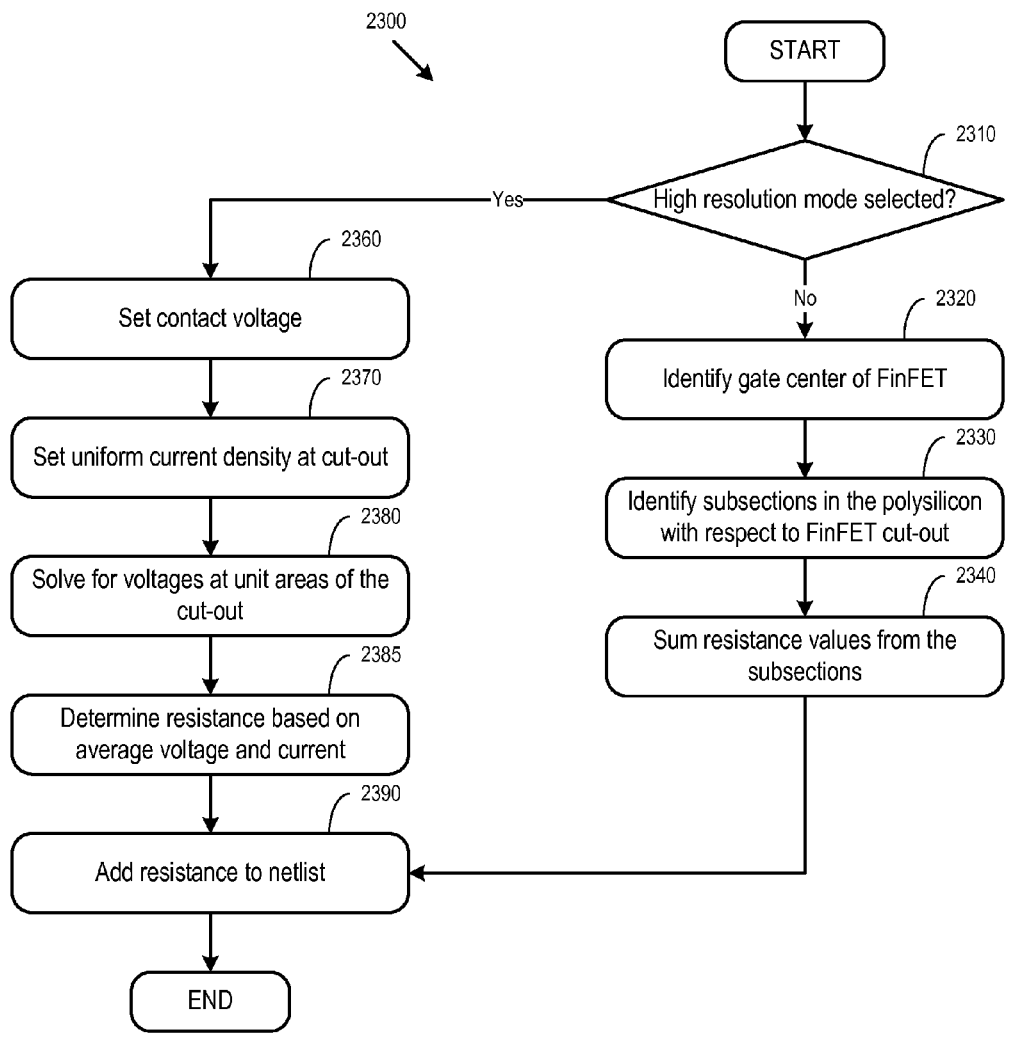
FIG. 23 conceptually illustrates a process that computes gate resistance for a FinFET device based on the FinFET cut-out of a polysilicon.

As mentioned above, a RC extraction tool (such as 110 of FIG. 1) extracts resistance values based on a process description file in some embodiments. In some embodiments, a process technology compiler (such as 820 of FIG. 8) computes resistance values based on a process description file. Some of these embodiments compute gate resistance values based on the modified square counting method as described above by reference to FIG. 20. Some of these embodiments compute gate resistance based on numerical solver as described above by reference to FIG. 21-22. Some embodiments offer both numerical solver and square counting method as options for users. FIG. 23 conceptually illustrates a process 2300 that computes gate resistance for a FinFET device based on the FinFET cut-out of a polysilicon. The process 2300 starts when the RC extractor has recognized a pattern of polygon as being a FinFET and is set to extract its gate resistance based on 3D parameters in a process description, or when a process technology compiler is about to compute a generic unit resistance for a polysilicon conductor having FinFET cut-outs based on the 3D parameters in the process description. In some embodiments, this process is performed during the operation 450 of the process 400 or during the operation 950 of the process 900.

The process determines (at 2310) high resolution mode for resistance extraction has been selected. Some embodiments allow a user to select either the modified square counting method (higher resolution mode) or the numerical solver method (low resolution mode) to compute resistance. A user may square counting method if computation time is more important than accuracy. Conversely, the user may also select numerical solving method if accuracy is more important than computation time. If the high resolution mode is selected (i.e., numerical solver), the process proceeds to 2360. Otherwise, the process proceeds to 2320 to perform square counting.

At 2320, the process identifies the gate center of the FinFET device. In some embodiments, this is provided by a marker layer in the design database, which provides the 2D location of the FinFET cut-out on a polygon that represents a polysilicon. The process then identifies (at 2330) sub-sections in the polysilicon with respect to FinFET cut outs. The process next sums (at 2340) the resistance values from sub-sections between the contact and the identified gate center. Operations 2320, 2330, and 2340 are described above by reference to FIG. 20. After having computed the gate resistance by summing the resistance values from the subsections of the polysilicon, the process adds (at 2395) or annotates the resistance value to the netlist. The process 2300 then ends.

At 2360, the process set the voltage at the contact of the polysilicon to zero. The process then sets (at 2370) uniform current density at unit surface areas of the FinFET cut-outs. Next, the process (at 2380) solves for voltages at the unit surface areas the FinFET cut-outs. The process determines (at 2390) the gate resistance value based on the average of the voltages at the unit surface areas. Operations 2360, 2370, 2380, 2385, 2390 are described above by reference to FIG. 21. After having computed the gate resistance by performing numerical solving, the process adds (at 2395) or annotates the resistance value to the netlist. The process 2300 then ends.

One of ordinary skill would recognize that not all embodiments perform both numerical solving and square counting. Some embodiments perform only square counting and hence do not perform operations 2310 and 2360-2385. Some embodiments perform only numerical solving and hence do not perform operations 2310 and 2320-2340.

Figure 24:
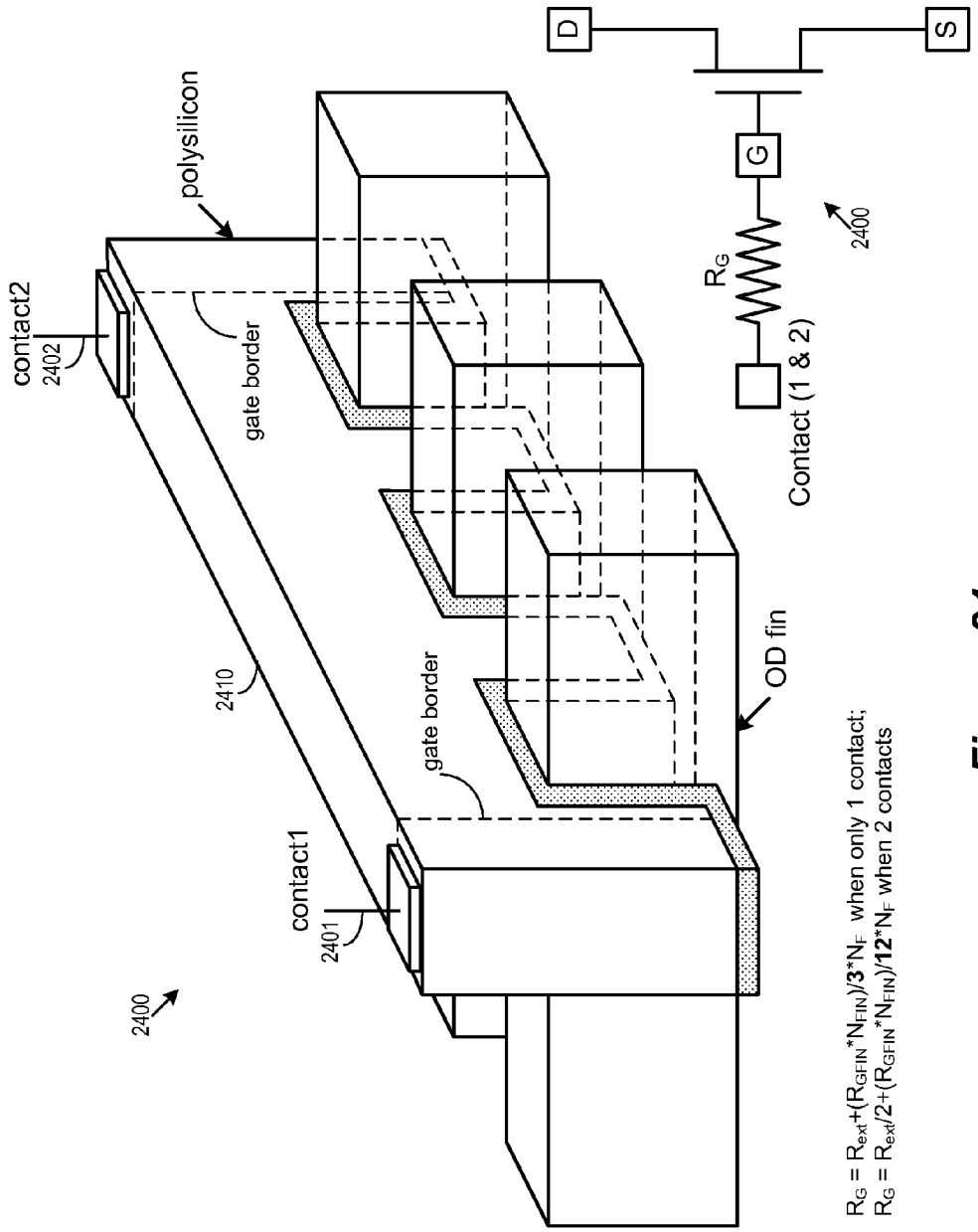
FIG. 24 illustrates the determination of gate resistance for a FinFET with two gate contacts at a polysilicon.

FIGS. 18-22 above illustrates polysilicon resistors in a FinFET device that have only one contact. However, some IC designs have FinFETs that have electrical contacts at both ends of the polysilicon. FIG. 24 illustrates the determination of gate resistance for a FinFET 2400 with two gate contacts 2401 and 2402 at a polysilicon 2410. The FinFET 2400 is similar to the FinFET 1800 of FIG. 18, except that the FinFET 2400 have two contacts 2401 and 2402 instead of only one. When only one contact is conducting, some embodiments compute the gate resistance $R_G$ according to $$R_G = R_{EXT} + (R_{GFIN} * N_{FIN})/3 * N_F \quad (1)$$

where $R_{EXT}$ is the resistance from the contact to the gate border, $R_{GFIN}$ is the resistance value per fin, $N_{FIN}$ is the number of fins for the FinFET, while $N_F$ is the number of fingers for the FinFET.

On the other hand, when both contacts 2401 and 2402 are conducting, some embodiments compute the gate resistance $R_G$ according to $$R_G = R_{EXT} + (R_{GFIN} * N_{FIN})/12 * N_F \quad (2)$$

Figure 25A:
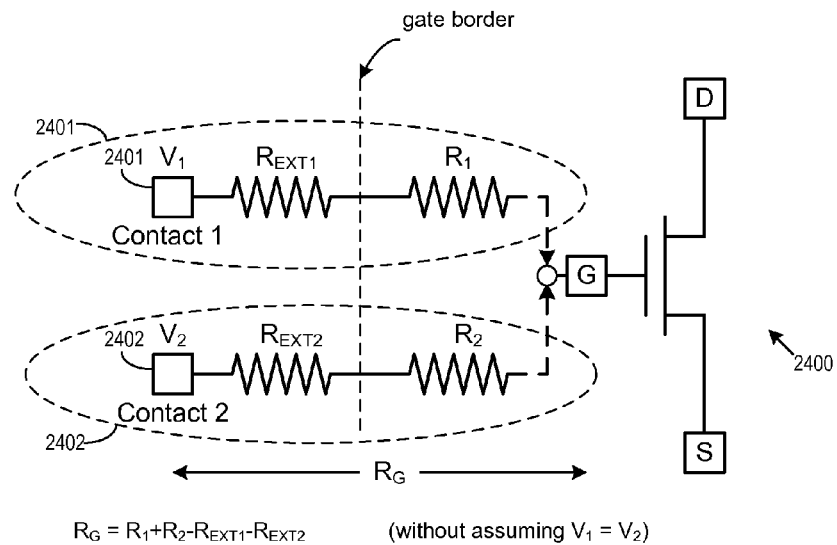
FIG. 25a illustrates the computation of equivalent gate resistance for a FinFET that does not assume that two gate contacts are at the same voltage level.

The equation (2) is valid only when both contacts are at the same voltage. Instead of assuming that the contacts 2401 and 2402 are at the same voltage, some embodiments compute gate resistance without making such assumptions. Such a computed gate resistance is valid even when the voltages at the two contacts are different (due to say, signal switching). FIG. 25a illustrates the computation of equivalent gate resistance $R_G$ for the FinFET 2400 that does not assume that two contacts are at the same voltage level.

As illustrated, the computation of $R_G$ is based on two sets of computed resistances 2501 and 2502. The first set of computed resistance is based on only the contact 2401, where $R_{EXT1}$ is the resistance between the contact 2401 and the gate border, and $R_1$ is the gate resistance value from the contact 2401 to the cut-out of the FinFET 2400. In some embodiments, $R_1$ is determined by a numerical solving (with only the contact 2401) while $R_{EXT1}$ is determined by square counting. The second set of computed resistance is based on only the contact 2402, where $R_{EXT2}$ is the resistance between the contact 2402 and the gate border, and $R_2$ is the gate resistance value from the contact 2402 to the cut-out of the FinFET 2400. In some embodiments, $R_2$ is determined by numerical solving (with only contact 2402) while $R_{EXT2}$ is determined by square counting. Some embodiments then compute the equivalent $R_G$ according to $$R_G = R_1 + R_2 - R_{EXT1} - R_{EXT2} \quad (3)$$

Figure 25B:
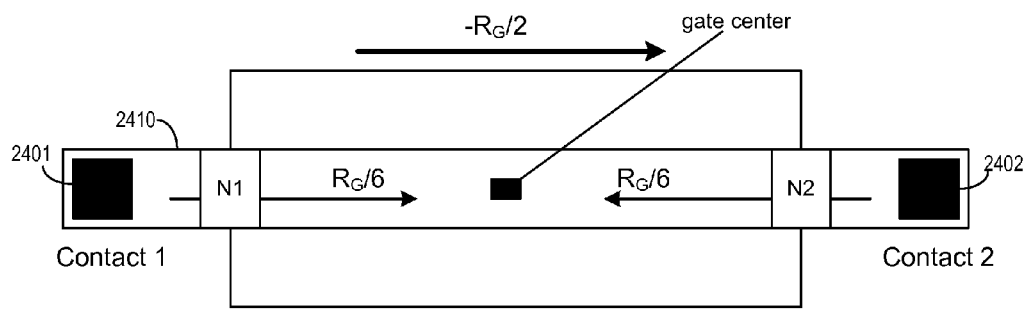
FIG. 25b illustrates the modeling of various resistance values in a FinFET based on an equivalent gate resistance value that does not assume the two contacts of the polysilicon are at the same voltage.

FIG. 25b illustrates the modeling of various resistance values in the FinFET 2400 based on $R_G$, which is an equivalent gate resistance value that does not assume the two contacts of the polysilicon 2410 are at the same voltage. As illustrated, the resistance from either contact to the gate center of the FinFET 2400 is $R_G/6$, while the resistance between the two contacts is modeled as a negative quantity $-R_G/2$.

III. Software Architecture

Figure 26:
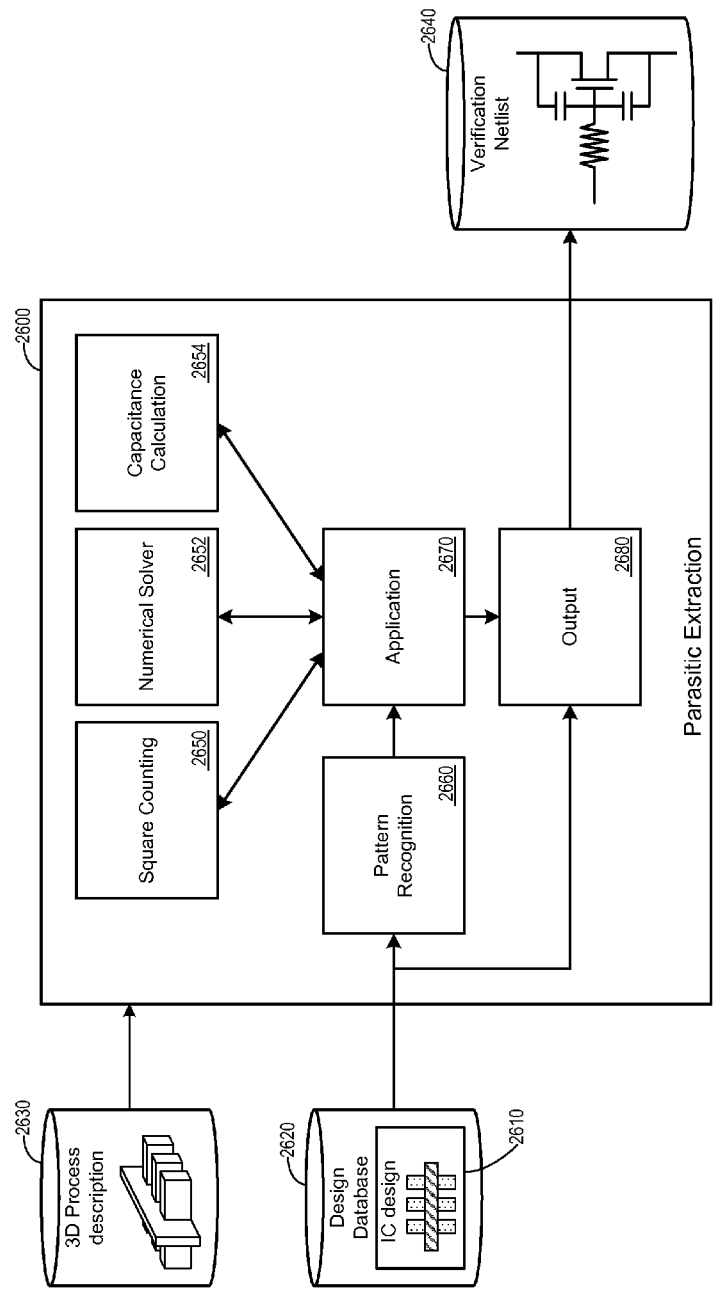
FIG. 26 conceptually illustrates the software architecture of a system that extracts parasitic capacitance and resistance values.

In some embodiments, the methods or systems for extracting capacitance and resistance values from an IC design described above are implemented as software running on a particular machine such as a computer. FIG. 26 conceptually illustrates the software architecture of a system 2600 that extracts parasitic capacitance and resistance values. In some embodiments, the parasitic extraction system 2600 is part of an IC design verification flow that is similar to the IC design flow 100 of FIG. 1. The system 2600 includes a square counting module 2650, a numerical solver 2652, and a capacitance calculation module 2654. The system also includes a pattern recognition module 2660, an application module 2670, and an output module 2680.

The pattern recognition module 2660 analyzes polygon patterns in a design database 2620, which is associated with an IC design 2610. The module 2660 identifies sections of the IC design as parasitic capacitors or resistors from the polygon patterns in the design database 2620. Identified sections of the IC design is then passed to an application module 2670, which selects and uses computations modules such as the square counting module 2650, the numerical solver 2652, and capacitance calculation module 2654 to compute the parasitic capacitance or resistance value for the identified sections.

The square counting module 2650, the numerical solver module 2652, and the capacitance calculation module 2654 determines the capacitance and resistance values based on the geometries of the polygon patterns in the design database 2620 and the descriptions of the process technology in the 3D process description 2630, which includes the 3D geometries of the FinFET cut-outs. In some embodiments, the system 2600 receives a compiled technology library that is generated off the 3D process description 2630.

For sections of the IC design that are identified as being capacitors, the capacitance calculation module 2654 calculates the capacitance value according to methods described above in Section I. For sections of the IC design that are identified as being resistors, the square counting module 2650 computes the resistance values for by using the square counting method and the numerical solver module 2652 computes the resistance values by using the numerical solver method. The square counting method and the numerical solving method are described above in Section II.

The result of the capacitance and/or resistance calculation is outputted by an output module 2680. In some embodiments, the output module 2680 produces a verification netlist for the IC design 2610 with the extracted capacitance and/or resistance values annotated within.

IV. Computer System

Figure 27:
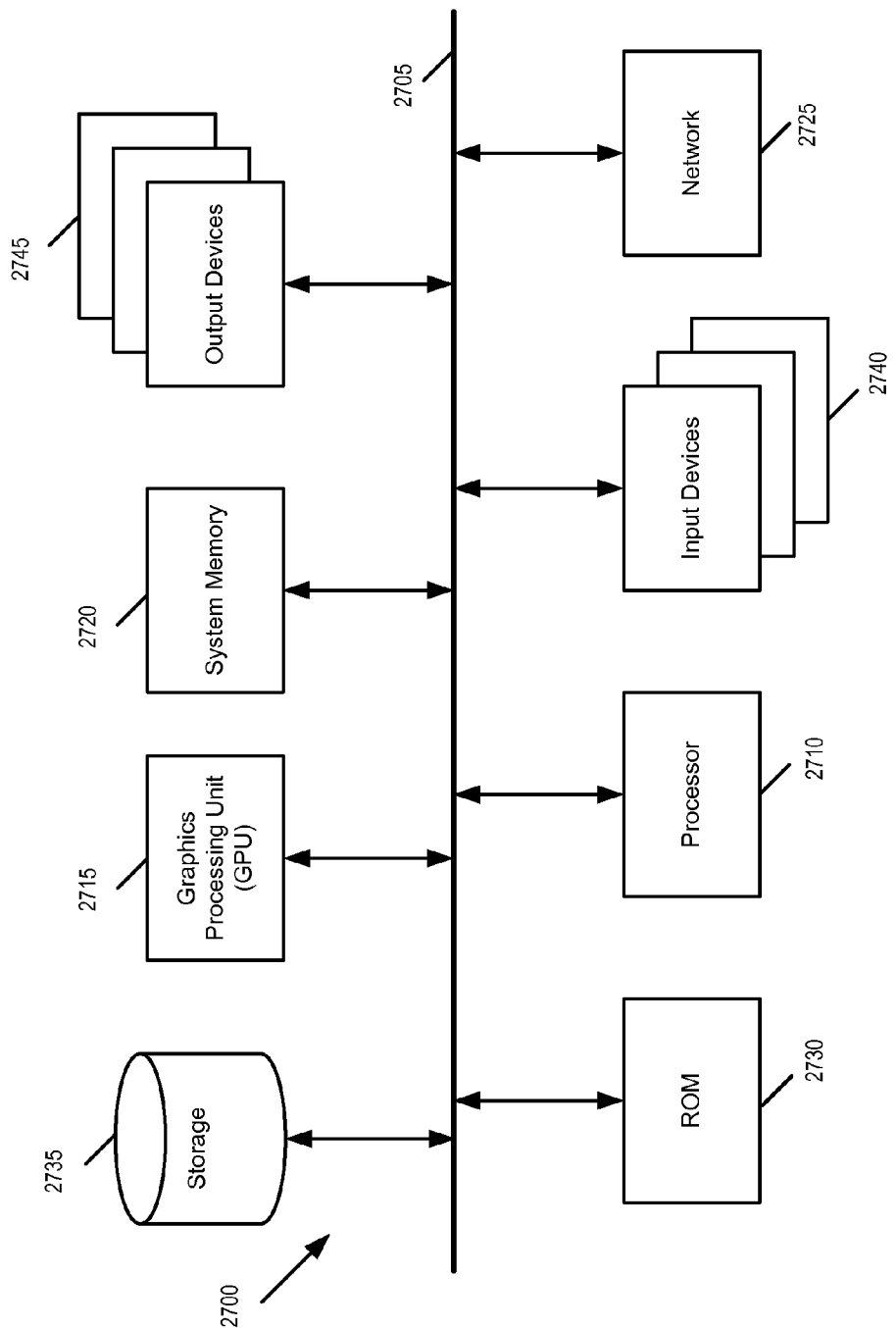
FIG. 27 conceptually illustrates an example of an electronic system with which some embodiments of the invention are implemented.

FIG. 27 conceptually illustrates an example of an electronic system 2700 with which some embodiments of the invention are implemented. The electronic system 2700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2700 includes a bus 2705, processing unit(s) 2710, a graphics processing unit (GPU) 2715, a system memory 2720, a network 2725, a read-only memory 2730, a permanent storage device 2735, input devices 2740, and output devices 2745.

The bus 2705 collectively represents all system, peripheral, and chipset buses that communicatively connect the numerous internal devices of the electronic system 2700. For instance, the bus 2705 communicatively connects the processing unit(s) 2710 with the read-only memory 2730, the GPU 2715, the system memory 2720, and the permanent storage device 2735.

From these various memory units, the processing unit(s) 2710 retrieves instructions to execute and data to process in order to execute the processes of the invention. The processing unit(s) may be a single processor or a multi-core processor in different embodiments. Some instructions are passed to and executed by the GPU 2715. The GPU 2715 can offload various computations or complement the image processing provided by the processing unit(s) 2710.

The read-only-memory (ROM) 2730 stores static data and instructions that are needed by the processing unit(s) 2710 and other modules of the electronic system. The permanent storage device 2735, on the other hand, is a read-and-write memory device. This device is a non-volatile memory unit that stores instructions and data even when the electronic system 2700 is off. Some embodiments of the invention use a mass-storage device (such as a magnetic or optical disk and its corresponding disk drive) as the permanent storage device 2735.

Other embodiments use a removable storage device (such as a floppy disk, flash memory device, etc., and its corresponding drive) as the permanent storage device. Like the permanent storage device 2735, the system memory 2720 is a read-and-write memory device. However, unlike storage device 2735, the system memory 2720 is a volatile read-and-write memory, such a random access memory. The system memory 2720 stores some of the instructions and data that the processor needs at runtime. In some embodiments, the invention's processes are stored in the system memory 2720, the permanent storage device 2735, and/or the read-only memory 2730. For example, the various memory units include instructions for processing multimedia clips in accordance with some embodiments. From these various memory units, the processing unit(s) 2710 retrieves instructions to execute and data to process in order to execute the processes of some embodiments.

The bus 2705 also connects to the input and output devices 2740 and 2745. The input devices 2740 enable the user to communicate information and select commands to the electronic system. The input devices 2740 include alphanumeric keyboards and pointing devices (also called "cursor control devices"), cameras (e.g., webcams), microphones or similar devices for receiving voice commands, etc. The output devices 2745 display images generated by the electronic system or otherwise output data. The output devices 2745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 27, bus 2705 also couples electronic system 2700 to a network 2725 through a network adapter (not shown). In this manner, the computer can be a part of a network of computers (such as a local area network ("LAN"), a wide area network ("WAN"), or an Intranet, or a network of networks, such as the Internet. Any or all components of electronic system 2700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 4, 6, 7, 9, 10, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for verifying an integrated circuit (IC) design in which a first conductor overlaps a second conductor by recessing from the second conductor in one or more cut-outs, the method comprising:
   receiving the IC design; and
   computing, by a computer, a resistance value for the first conductor from a contact to the cut-outs by (i) dividing surface areas of the cut-outs into a plurality of unit surface areas, (ii) setting electrical current entering each of the unit surface areas to be a uniform value, and (iii) numerically solving a voltage value for each of the unit surface areas.

2. The method of claim 1, wherein computing the resistance value further comprises setting a voltage value at the contact to a unit value.

3. The method of claim 1, wherein computing the resistance value further comprises setting a current value entering the first conductor from the contact to a unit value.

4. The method of claim 1, wherein an electrical current entering a unit surface area is a first component of a current vector, the current vector further comprising a second component, wherein the first component is perpendicular to the unit surface area and the second component is parallel to the unit surface area.

5. The method of claim 1, wherein the voltage value at each unit surface area is determined based on a spatial position of the unit surface area.

6. The method of claim 5, wherein the spatial position of each unit surface area is determined based on (i) a number of cut-outs, (ii) a location of a first cut-out, (iii) a width of each cut-out, (iv) a spacing between two neighboring cut-outs, and (v) a thickness of the first conductor.

7. The method of claim 5, wherein the spatial position of each unit surface area is determined based on dimensions of the cut-outs.

8. The method of claim 7, wherein the dimensions of the cut-outs are provided by a process description file that specifies a process technology for building the IC.

9. The method of claim 1, wherein the cut-outs of the first conductor form a gate of a transistor, the method further comprising determining an equivalent gate resistance from the contact to the gate of the transistor based on an average value of the voltages at each of the unit surface areas.

10. The method of claim 1, wherein numerically solving the voltage values for the unit surface areas comprises solving a Laplace boundary value problem.

11. A non-transitory computer readable medium storing a computer program for extracting parasitic components in an integrated circuit (IC) design in which a first conductor overlaps a second conductor by recessing from the second conductor in one or more cut-outs, the program executable on one or more processing units, the computer program comprising sets of instructions for:
    receiving the IC design; and
    computing a resistance value for the first conductor from a contact to the cut-outs by (i) dividing surface areas of the cut-outs into a plurality of unit surface areas, (ii) setting electrical current entering each of the unit surface areas to be a same value for all unit surface areas, and (iii) numerically solving a voltage value for each of the unit surface areas.

12. The non-transitory computer readable medium of claim 11, wherein the set of instructions for computing the resistance value further comprises a set of instructions for setting a voltage value at the contact to a unit value.

13. The non-transitory computer readable medium of claim 11, wherein the set of instructions for computing the resistance value further comprises a set of instructions for setting a current value entering the first conductor from the contact to a unit value.

14. The non-transitory computer readable medium of claim 11, wherein an electrical current entering a unit surface area is a current vector that is perpendicular to the unit surface area.

15. The non-transitory computer readable medium of claim 11, wherein the voltage value at each of the unit surface area is determined based on a spatial position of the unit surface area.

16. The non-transitory computer readable medium of claim 15, wherein the spatial position of each unit surface area is determined based on (i) a number of cut-outs; (ii) a location of a first cut-out; (iii) a width of each cut-out; and (iv) a spacing between two neighboring cut-outs.

17. The non-transitory computer readable medium of claim 15, wherein the spatial position of each unit surface area is determined based on dimensions of the cut-outs.

18. The non-transitory computer readable medium of claim 17, wherein the dimensions of the cut-outs are provided by a process description file that specifies a process technology for building the IC.

19. The non-transitory computer readable medium of claim 11, wherein the cut-outs of the first conductor forms a gate of a transistor, the computer program further comprising a set of instructions for determining an equivalent gate resistance from the contact to the gate of the transistor based on an average value of the voltages at each of the unit surface areas.

20. The non-transitory computer readable medium of claim 11, wherein the set of instructions for numerically solving the voltage values at each of the unit surface areas comprises a set of instructions for solving a Laplace boundary value problem.

21. A system for extracting parasitic elements from an integrated circuit (IC) design in which a first conductor overlaps a second conductor by recessing from the second conductor in one or more cut-outs, the system comprising:
    a solver module for computing a high-resolution resistance value for the first conductor by numerically solving voltage values at each of a plurality of unit surface areas along the cut-outs;
    a square counting module for computing a low-resolution resistance value for the first conductor; and
    an application module for generating a resistance value from a contact of the first conductor to the cut-outs based on a first resistance value and a second resistance value.

22. The system of claim 21, wherein the square counting module computes the low-resolution resistance value by dividing the first conductor into a plurality of sections based on the cut-outs.

23. The system of claim 21, wherein the solver module sets electrical current entering each of the unit surface areas to be the same for all unit surface areas.

24. The system of claim 21 further comprises a module for receiving a conductor description that specifies dimensions of the cut-outs for the first conductor.

25. The system of claim 24, wherein the solver module determines the voltage value at each unit surface area based on a spatial position of the unit surface area, wherein the spatial position of the unit surface area is based on the dimensions of the cut-outs specified by the received conductor description.

26. The system of claim 24, wherein the conductor description is part of a technology library that specifies a process technology for building the IC.

* * * * *